United States Patent
Aono et al.

(10) Patent No.: US 12,126,819 B2
(45) Date of Patent: *Oct. 22, 2024

(54) VIDEO ENCODING DEVICE AND VIDEO DECODING DEVICE

(71) Applicant: Sharp Kabushiki Kaisha, Sakai (JP)

(72) Inventors: Tomoko Aono, Sakai (JP); Tomohiro Ikai, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/509,398

(22) Filed: Nov. 15, 2023

(65) Prior Publication Data

US 2024/0089469 A1 Mar. 14, 2024

Related U.S. Application Data

(63) Continuation of application No. 17/492,748, filed on Oct. 4, 2021, now Pat. No. 11,863,764, which is a continuation of application No. 16/607,765, filed as application No. PCT/JP2018/016408 on Apr. 23, 2018, now abandoned.

(30) Foreign Application Priority Data

Apr. 28, 2017 (JP) .................................. 2017-089788

(51) Int. Cl.
*H04N 19/176* (2014.01)
*H04N 19/122* (2014.01)
*H04N 19/159* (2014.01)
*H04N 19/18* (2014.01)
*H04N 19/61* (2014.01)

(52) U.S. Cl.
CPC ......... *H04N 19/176* (2014.11); *H04N 19/122* (2014.11); *H04N 19/159* (2014.11); *H04N 19/18* (2014.11); *H04N 19/61* (2014.11)

(58) Field of Classification Search
CPC .. H04N 19/176; H04N 19/122; H04N 19/159; H04N 19/18; H04N 19/61
See application file for complete search history.

(56) References Cited

U.S. PATENT DOCUMENTS

2012/0127003 A1* 5/2012 Shibahara ............ H04N 19/129
341/87

OTHER PUBLICATIONS

Aono et al., "Video Encoding Device and Video Decoding Device", U.S. Appl. No. 17/492,748, filed Oct. 4, 2021.

* cited by examiner

*Primary Examiner* — Dakshesh D Parikh
(74) *Attorney, Agent, or Firm* — Keating & Bennett, LLP

(57) ABSTRACT

A device is provided with: a first transformer which transforms an coding unit (CU); and a second transformer which transforms a part of first transform coefficients output from the first transformer, wherein the second transformer transforms at least any of the first transform coefficients for a region (first region) having different sizes in a horizontal direction and a vertical direction or the first transform coefficients for a non-rectangular region (second region).

2 Claims, 25 Drawing Sheets

(a)

| iPred | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Tpred | 0 | 1 | 2 | 3 | 4 | 5 | 6 | 7 | 8 | 9 | 10 | 11 | 12 | 13 | 14 | 15 | 16 |
| iPred | 17 | 18 | 19 | 20 | 21 | 22 | 23 | 24 | 25 | 26 | 27 | 28 | 29 | 30 | 31 | 32 | 33 |
| Tpred | 17 | 18 | 19 | 20 | 21 | 22 | 23 | 24 | 25 | 26 | 27 | 28 | 29 | 30 | 31 | 32 | 33 |
| iPred | 34 | 35 | 36 | 37 | 38 | 39 | 40 | 41 | 42 | 43 | 44 | 45 | 46 | 47 | 48 | 49 | 50 |
| Tpred | 34 | 33 | 32 | 31 | 30 | 29 | 28 | 27 | 26 | 25 | 24 | 23 | 22 | 21 | 20 | 19 | 18 |
| iPred | 51 | 52 | 53 | 54 | 55 | 56 | 57 | 58 | 59 | 60 | 61 | 62 | 63 | 64 | 65 | 66 | 67 (LM) |
| Tpred | 17 | 16 | 15 | 14 | 13 | 12 | 11 | 10 | 9 | 8 | 7 | 6 | 5 | 4 | 3 | 2 | NULL |

(b)

| nIdx | TRANSFORM COEFFICIENT |
|---|---|
| 0 | (SECONDARY TRANSFORM OFF) |
| 1 | T[iPred][0][0..M*N-1] |
| 2 | T[iPred][1][0..M*N-1] |
| 3 | T[iPred][2][0..M*N-1] |

(a) VERTICAL DIRECTION (b) HORIZONTAL DIRECTION (c) OBLIQUE DIRECTION

FIG. 14

(a) VERTICAL DIRECTION SCAN (b) HORIZONTAL DIRECTION SCAN (c) OBLIQUE DIRECTION SCAN (a) L=1, 3, 4

(a)

| nIdx | SECONDARY TRANSFORM | INVERSE SECONDARY TRANSFORM | REMARKS |
|---|---|---|---|
| 0 | - | - | OFF |
| 1 | [Tdf] | [Tdb] | NON-SEPARATION TYPE |
| 2 | [ROThf_N], [ROThf_M] | [ROThb_N], [ROThb_M] | N<M |
| 3 | [ROTvf_N], [ROTvf_M] | [ROTvb_N], [ROTvb_M] | N>M |

(b)

| nIdx | SECONDARY TRANSFORM | INVERSE SECONDARY TRANSFORM | REMARKS |
|---|---|---|---|
| 0 | - | - | OFF |
| 1 | [Tdf] | [Tdb] | NON-SEPARATION TYPE |
| 2 | [Thf] | [Thb] | NON-SEPARATION TYPE (N<M) |
| 3 | [Tvf] | [Tvb] | NON-SEPARATION TYPE (N>M) |

FIG. 20

| INTRA PREDICTION MODE | nIdx | REMARKS |
|---|---|---|
| predHor-diff~predHor+diff | 0, 1, 3 | FILTERS SUITABLE FOR OFF, OBLIQUE DIRECTION AND HORIZONTAL DIRECTION |
| predVer-diff~predVer+diff | 0, 1, 2 | FILTERS SUITABLE FOR OFF, OBLIQUE DIRECTION AND VERTICAL DIRECTION |
| OTHER THAN THE ABOVE | 0, 1 | FILTERS SUITABLE FOR OFF, OBLIQUE DIRECTION |

FIG. 22

VIDEO ENCODING DEVICE AND VIDEO DECODING DEVICE

TECHNICAL FIELD

The present invention relates to an image decoding device and an image encoding device.

BACKGROUND ART

An image encoding device which generates coded data by coding a video, and an image decoding device which generates decoded images by decoding the coded data are used to transmit or record a video efficiently.

For example, specific video coding schemes include schemes proposed in H.264/AVC and High-Efficiency Video Coding (HEVC).

In such a video coding scheme, images (pictures) constituting a video are managed by a hierarchy structure including slices obtained by splitting images, units of coding (also referred to as coding unit (CUs)) obtained by splitting slices, prediction units (PUs) which are blocks obtained by splitting coding units, and transform units (TUs), and are coded/decoded for each CU.

In such a video coding scheme, usually, a prediction image is generated based on local decoded images obtained by coding/decoding input images, and prediction residuals (also sometimes referred to as "difference images" or "residual images") obtained by subtracting the prediction images from input images (original image) are coded. Generation methods of prediction images include an inter-screen prediction (an inter prediction) and an intra-screen prediction (intra prediction).

In a video encoding device, quantization transform coefficients where orthogonal transform and quantization have been performed on the prediction residuals are coded, and in a video decoding device, quantization transform coefficients are decoded from coded data, and inverse quantization and inverse orthogonal transform are performed to recover the prediction residuals (NPL 2). In recent years, a technique has been developed in which transform coefficient values are concentrated in the vicinity of zero and the amount of coding is reduced by performing second transform (secondary transform) on transform coefficients after performing first orthogonal transform (primary transform) on prediction residuals (NPL 1).

CITATION LIST

Non Patent Literature

NPL 1: "Algorithm Description of Joint Exploration Test Model 5", JVET-E1001, Joint Video Exploration Team (JVET) of ITU-T SG 16 WP 3 and ISO/IEC JTC 1/SC 29/WG 11, 12-20 Jan. 2017

NPL 2: ITU-T H.265 (April 2015) SERIES H: AUDIO-VISUAL AND MULTIMEDIA SYSTEMS Infrastructure of audiovisual services—Coding of moving video High efficiency video coding

SUMMARY OF INVENTION

Technical Problem

In NPL 1, the image encoding device performs primary transform on prediction residuals to concentrate the energy in specific components, and then performs secondary transform on transform coefficients of the prediction residuals, to further increase the energy concentration. The image encoding device performs quantization and entropy coding processing on the results to generate coded data. The image decoding device performs inverse secondary inverse transform and inverse primary inverse transform on the transform coefficients where entropy decoding and the inverse quantization are performed on the coded data.

With the secondary transform, the energy is concentrated in certain components (low frequency components), but greatly increases the amount of processing. In a case of using non-separable transform for secondary transform, the energy concentration of diagonal direction components that could not be handled in separable primary transform can also be increased, so the line segments in the diagonal direction with high quality can be reproduced. However, as the operation amount of transform with a length N is known to be $O(N^2)$ or $O(N\log N)$, transform of long components increases the complexity.

The present invention is made in view of the problem described above, and has an object to provide an image decoding device and an image encoding device that are capable of reducing the amount of processing and the complexity of transform while maintaining coding amount reduction effects.

Solution to Problem

An image encoding device according to one aspect of the present invention includes: a divider configured to divide a picture of the input video into a coding unit (CU) including multiple pixels; a transformer configured to perform predetermined transform with the CU as a unit and output transform coefficients;

a quantizer configured to quantize the transform coefficients and output quantization transform coefficients; and an encoder configured to perform variable-length coding on the quantization transform coefficients, wherein the transformer includes a first transformer, and a second transformer configured to perform transform on a part of first transform coefficients output from the first transformer, and the second transformer performs transform on at least any of the first transform coefficients for a region (first region) having different sizes in a horizontal direction and a vertical direction, or the first transform coefficients for a non-rectangular region (second region).

An image decoding device according to one aspect of the present invention includes: a decoder configured to perform variable-length decoding on coded data with a coding unit (CU) including multiple pixels as a processing unit, and output quantization transform coefficients; an inverse quantizer configured to perform inverse quantization on quantization transform coefficients and output transform coefficients; and an inverse transformer configured to perform inverse transform on the transform coefficients, wherein the inverse transformer includes a second inverse transformer configured to perform inverse transform on at least a part of the transform coefficients and outputting second transform coefficients, and a first inverse transformer configured to perform inverse transform on a remainder of the transform coefficients and the second transform coefficients, and the second inverse transformer performs inverse transform on at least any of the transform coefficients for a region (first region) having different sizes in a horizontal direction and a vertical direction, or the transform coefficients for a non-rectangular region (second region).

Advantageous Effects of Invention

According to one aspect of the present invention, the amount of processing of video coding and decoding and the memory used can be reduced while suppressing reduction in the coding efficiency.

BRIEF DESCRIPTION OF DRAWINGS

FIG. 12 is a table illustrating a correspondence relationship between an intra prediction mode and secondary transform.

FIG. 14 is a diagram illustrating 32 coefficients for inputting to secondary transform.

FIG. 20 is a table illustrating specific examples of secondary transform sets.

FIG. 22 is another table illustrating a correspondence relationship between an intra prediction mode and secondary transform.

DESCRIPTION OF EMBODIMENTS

Embodiment 1

Hereinafter, embodiments of the present invention are described with reference to the drawings.

Figure 1:
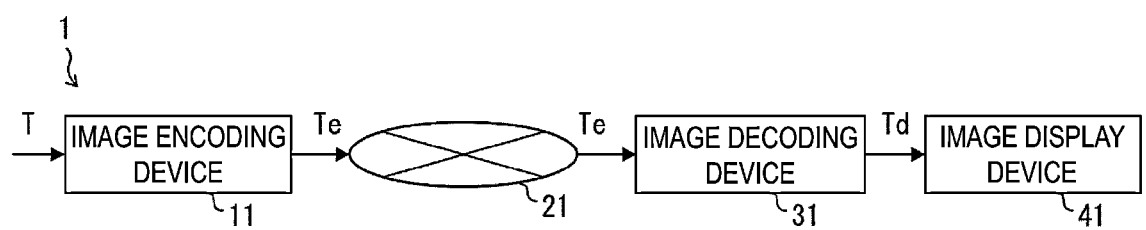
FIG. 1 is a schematic diagram illustrating a configuration of an image transmission system according to one embodiment of the present invention.

FIG. 1 is a schematic diagram illustrating a configuration of an image transmission system 1 according to the present embodiment.

The image transmission system 1 is a system configured to transmit codes of a coding target image having been coded, decode the transmitted codes, and display an image. The image transmission system 1 includes an image encoding device 11, a network 21, an image decoding device 31, and an image display device 41.

An image T indicating an image of a single layer or multiple layers is input to the image encoding device 11. A layer is a concept used to distinguish multiple pictures in a case that there are one or more pictures to configure a certain time. For example, coding an identical picture in multiple layers having different image qualities and resolutions is scalable coding, and coding pictures having different viewpoints in multiple layers is view scalable coding. In a case of performing a prediction (an inter-layer prediction, an inter-view prediction) between pictures in multiple layers, coding efficiency greatly improves. In a case of not performing a prediction, in a case of (simulcast), coded data can be compiled.

The network 21 transmits a coding stream Te generated by the image encoding device 11 to the image decoding device 31. The network 21 is the Internet (internet), Wide Area Network (WAN), Local Area Network (LAN), or combinations thereof. The network 21 is not necessarily a bidirectional communication network, but may be a unidirectional communication network configured to transmit broadcast wave such as digital terrestrial television broadcasting and satellite broadcasting. The network 21 may be substituted by a storage medium that records the coding stream Te, such as Digital Versatile Disc (DVD) and Blu-ray Disc (BD (trade name)).

The image decoding device 31 decodes each of the coding streams Te transmitted by the network 21, and generates one or multiple decoded images Td having decoded each.

The image display device 41 displays all or part of one or multiple decoded images Td generated by the image decoding device 31. For example, the image display device 41 includes a display device such as a liquid crystal display and an organic Electro-luminescence (EL) display. In spatial scalable coding and SNR scalable coding, in a case that the image decoding device 31 and the image display device 41 have high processing capability, an enhanced layer image having high image quality is displayed, and in a case of having lower processing capability, a base layer image which does not require as high processing capability and display capability as an enhanced layer is displayed.

Operator

Operators used herein will be described below.

>> is a right bit shift, << is a left bit shift, & is a bitwise AND, | is a bitwise OR, and |=is a sum operation (OR) with another condition.

x? y:z is a ternary operator to take y in a case that x is true (other than 0), and take z in a case that x is false (0).

Clip3 (a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).

Structure of Coding Stream Te

Prior to detailed descriptions of the image encoding device 11 and the image decoding device 31 according to the present embodiment, a data structure of the coding stream Te generated by the image encoding device 11 and decoded by the image decoding device 31 will be described.

Figure 2:
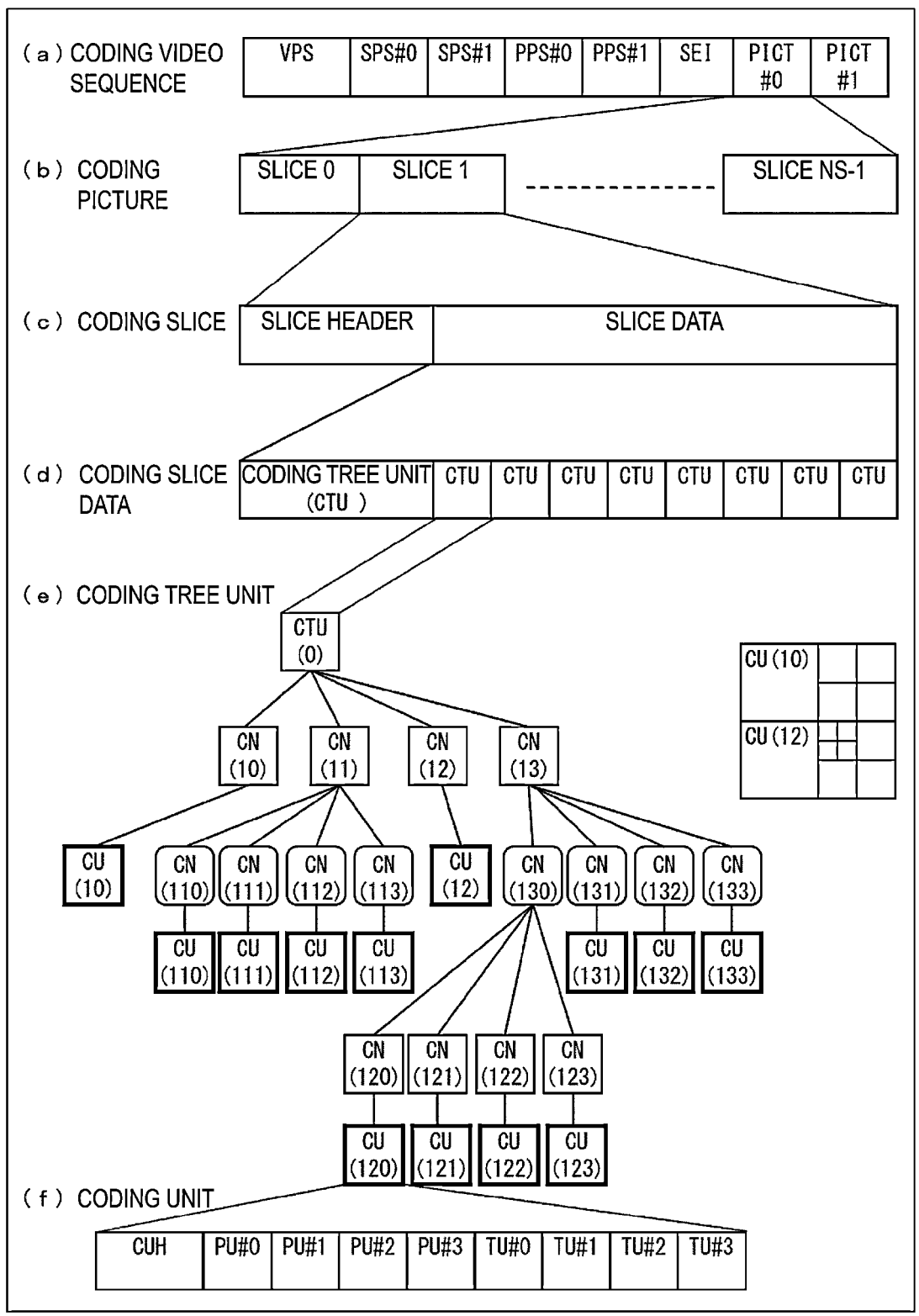
FIG. 2 is a diagram illustrating a hierarchy structure of data of a coding stream according to one embodiment of the present invention.

FIG. 2 is a diagram illustrating a hierarchy structure of data in the coding stream Te. The coding stream Te includes a sequence and multiple pictures constituting a sequence illustratively. (a) to (f) of FIG. 2 are diagrams indicating a coding video sequence prescribing a sequence SEQ, a coding picture prescribing a picture PICT, a coding slice prescribing a slice S, coding slice data prescribing slice data, coding tree units included in coding slice data, and Coding Units (CUs) included in a coding tree unit, respectively.

Coding Video Sequence

In the coding video sequence, a set of data referred to by the image decoding device 31 to decode the sequence SEQ of a processing target is prescribed. As illustrated in (a) of FIG. 2, the sequence SEQ includes a Video Parameter Set, a Sequence Parameter Set SPS, a Picture Parameter Set PPS, a picture PICT, and a Supplemental Enhancement Information SEI. Here, a value indicated after #indicates a layer ID. In FIG. 2, an example is illustrated where coded data of #0 and #1, in other words, layer 0 and layer 1 exists, but types of layers and the number of layers do not depend on this.

In the video parameter set VPS, in a video including multiple layers, a set of coding parameters common to multiple videos and a set of coding parameters associated with multiple layers and an individual layer included in a video are prescribed.

In the sequence parameter set SPS, a set of coding parameters referred to by the image decoding device 31 to decode a target sequence is prescribed. For example, width and height of a picture are prescribed. Note that multiple SPSs may exist. In that case, any of multiple SPSs is selected from the PPS.

In the picture parameter set PPS, a set of coding parameters referred to by the image decoding device 31 to decode each picture in the target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in the target sequence.

Coding Picture

In the coding picture, a set of data referred to by the image decoding device 31 to decode the picture PICT of a processing target is prescribed. As illustrated in (b) of FIG. 2, the picture PICT includes slices S0 to $S_{NS-1}$ (NS is the total number of slices included in the picture PICT).

Note that in a case that it is not necessary to distinguish each of the slices S0 to $S_{NS-1}$, subscripts of reference signs may be omitted and described below. The same applies to other data included in the coding stream Te described below and data described with a subscript added.

Coding Slice

In the coding slice, a set of data referred to by the image decoding device 31 to decode the slice S of a processing target is prescribed. As illustrated in (c) of FIG. 2, the slice S includes a slice header SH and slice data SDATA.

The slice header SH includes a coding parameter group referred to by the image decoding device 31 to determine a decoding method of a target slice. Slice type specification information (slice_type) to specify a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a uni-prediction or a bi-prediction, and a greater number of reference pictures may be used to generate a prediction image. Hereinafter, P and B slices refer to slices that include a block that can employ an inter prediction.

Note that, the slice header SH may include a reference (pic_parameter_set_id) to the picture parameter set PPS included in the above described coding video sequence.

Coding Slice Data

In the coding slice data, a set of data referred to by the image decoding device 31 to decode the slice data SDATA of a processing target is prescribed. As illustrated in (d) of FIG. 2, the slice data SDATA includes Coding Tree Units (CTUs). The CTU is a block of a fixed size (for example, 64×64) constituting a slice, and may be referred to as a Largest Coding Unit (LCU).

Coding Tree Unit

As illustrated in (e) of FIG. 2, a set of data referred to by the image decoding device 31 to decode a coding tree unit of a processing target is prescribed. The coding tree unit is split by recursive quad tree splits (QT splits) or binary tree splits (BT splits) into Coding Units (CUs), each of which is a basic unit of coding processing. A tree structure obtained by recursive quad tree splits or binary tree splits is referred to as a Coding Tree (CT), and nodes of the tree structure is referred to as Coding Nodes (CN). Intermediate nodes of quad trees or binary trees are coding nodes, and each of the coding tree unit itself is also prescribed as the highest coding node.

The CT includes a QT split flag (cu_split_flag) indicating whether or not to perform a QT split and a BT split mode (split_bt_mode) indicating a split method of a BT split as CT information. cu_split_flag and/or split_bt_mode is transmitted for each coding node CN. In a case that cu_split_flag is 1, the coding node CN is split into four coding node CNs. In a case that cu_split_flag is 0, and in a case that split_bt_mode is 1, the coding node CN is split horizontally into two coding nodes CNs. In a case that split_bt_mode is 2, the coding node CN is split vertically into two coding nodes CNs. In a case that split_bt_mode is 0, the coding node CN is not split, having one coding unit CU as a node. The coding unit CU is an end node (leaf node) of the coding nodes, and is not split anymore.

In a case that the size of the coding tree unit CTU is 64×64 pixels, the size of the coding unit can take any of 64×64 pixel, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in (f) of FIG. 2, a set of data referred to by the image decoding device 31 to decode the coding unit of a processing target is prescribed. Specifically, the coding unit includes a prediction tree, a transform tree, and a CU header CUH. In the CU header, a prediction mode, a split method (PU split mode), and the like are prescribed.

In the prediction tree, prediction parameters (a reference picture index, a motion vector, and the like) of each prediction unit (PU) where the coding unit is split into one or multiple pieces is prescribed. In another expression, the prediction unit is one or multiple non-overlapping regions constituting the coding unit. The prediction tree includes one or multiple prediction units obtained by the above-mentioned split. Note that, in the following, a unit of prediction where the prediction unit is further split is referred to as a "subblock". The subblock includes multiple pixels. In a case that the sizes of the prediction unit and the subblock are the same, there is one subblock in the prediction unit. In a case that the prediction unit is larger than the size of the subblock, the prediction unit is split into subblocks. For example, in a case that the prediction unit is 8×8, and the subblock is 4×4, the prediction unit is split into four subblocks formed by horizontal split into two and vertical split into two.

The prediction processing may be performed for each of these prediction units (subblocks).

Generally speaking, there are two types of splits in the prediction tree, including a case of an intra prediction and a case of an inter prediction. The intra prediction is a prediction in an identical picture, and the inter prediction refers to a prediction processing performed between mutually different pictures (for example, between display times, and between layer images).

In a case of an intra prediction, the split method has 2N×2N (the same size as the coding unit) and N×N.

In a case of an inter prediction, the split method includes coding by a PU split mode (part_mode) of the coded data, and includes 2N×2N (the same size as the coding unit), 2N×N, 2N×nU, 2N×nD, N×2N, nL×2N, nR×2N and N×N, and the like. Note that 2N×N and N×2N indicate a symmetric split of 1:1, and 2N×nU, 2N×nD and nL×2N, nR×2N indicate an asymmetry split of 1:3 or 3:1. The PUs included in the CU are expressed as PU0, PU1, PU2, and PU3 sequentially.

Figure 3:
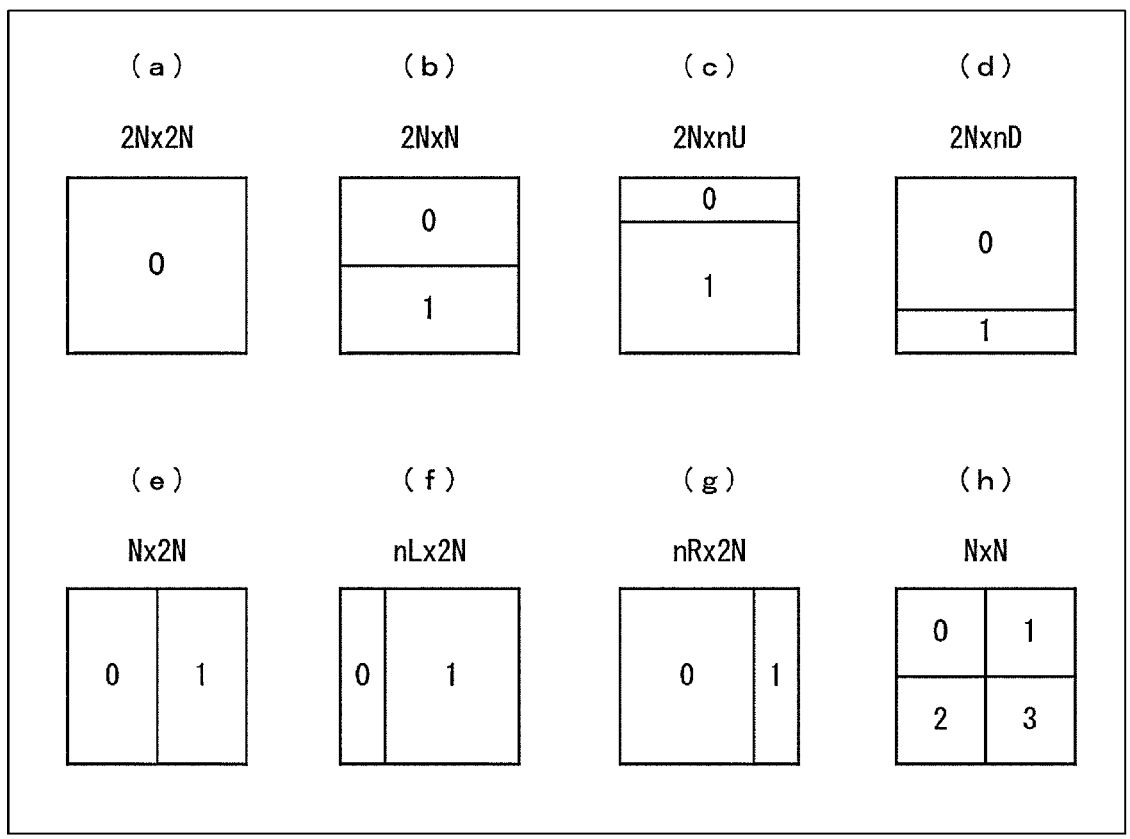
FIG. 3 is a diagram illustrating patterns of PU split modes. (a) to (h) illustrate partition shapes in cases that PU split modes are 2N×2N, 2N×N, 2N×nU, 2N×nD, N×2N, nL×2N, nR×2N, and N×N, respectively.

(a) to (h) of FIG. 3 illustrate shapes of partitions in respective PU split modes (positions of boundaries of PU splits) specifically. (a) of FIG. 3 indicates a partition of 2N×2N, and (b), (c), and (d) of FIG. 3 indicate partitions (horizontally long partitions) of 2N×N, 2N×nU, and 2N×nD, respectively. (e), (f), and (g) of FIG. 3 illustrate partitions (vertically long partitions) in cases of N×2N, nL×2N, and nR×2N, respectively, and (h) of FIG. 3 illustrates a partition of N×N. Note that horizontally long partitions and vertically long partitions are collectively referred to as rectangular partitions, and 2N×2N and N×N are collectively referred to as square partitions.

In the transform tree, the coding unit is split into one or multiple transform units, and a position and a size of each transform unit are prescribed. In another expression, the transform unit is one or multiple non-overlapping regions constituting the coding unit. The transform tree includes one or multiple transform units obtained by the above-mentioned split.

Splits in the transform tree include those to allocate a region that is the same size as the coding unit as a transform unit, and those by recursive quad tree splits similar to the above-mentioned split of CUs.

A transform processing is performed for each of these transform units.

Prediction Parameter

A prediction image of Prediction Units (PUs) is derived by prediction parameters attached to the PUs. The prediction parameter includes a prediction parameter of an intra prediction or a prediction parameter of an inter prediction. The prediction parameter of an inter prediction (inter prediction parameter) will be described below. The inter prediction parameter is constituted by prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values or false values in real devices and methods.

For example, syntax elements to derive inter prediction parameters included in a coded data include a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX.

Reference Picture List

Figure 4:
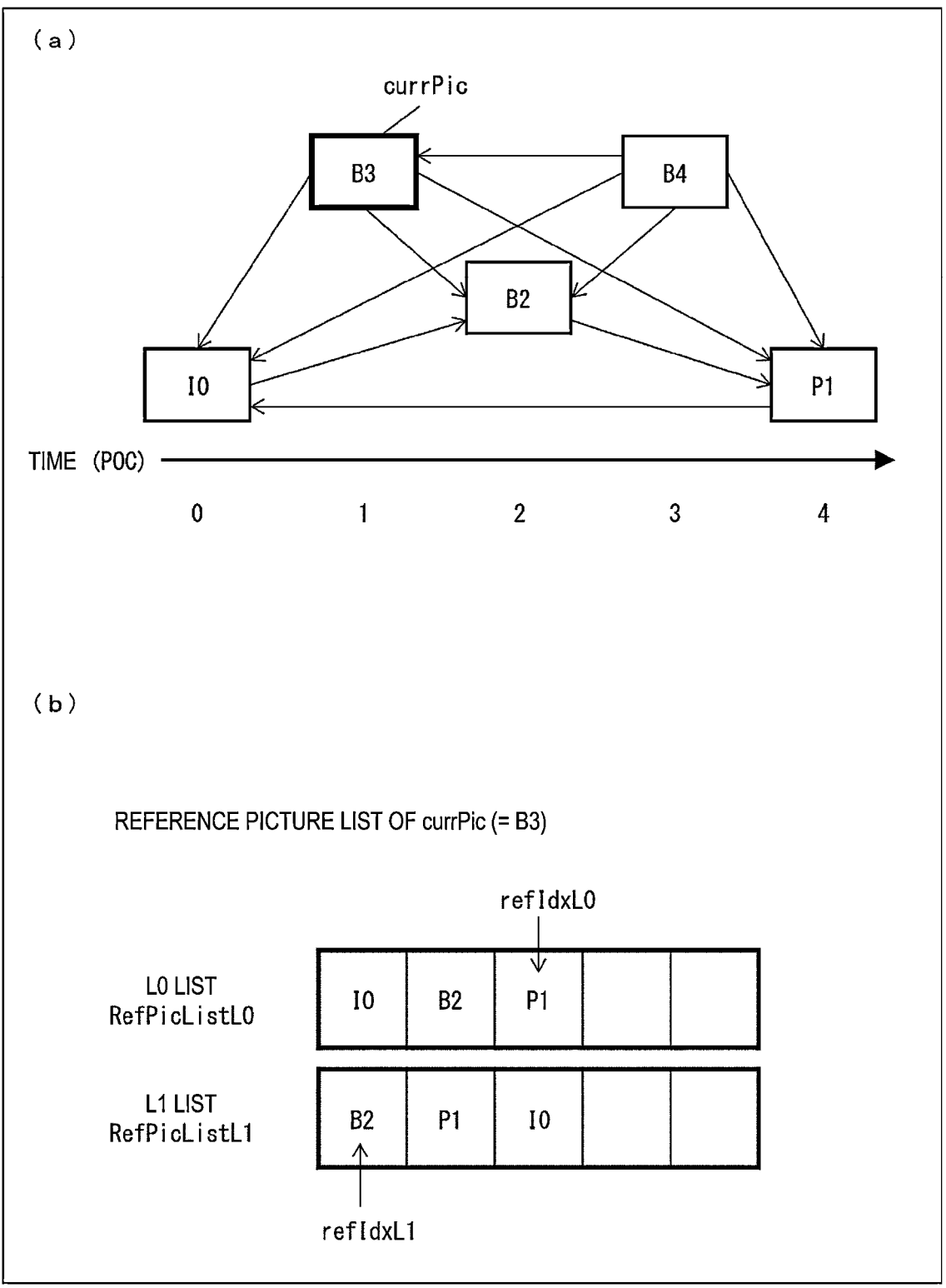
FIG. 4 is a conceptual diagram illustrating an example of reference pictures and reference picture lists.

A reference picture list is a list constituted by reference pictures stored in a reference picture memory 306. FIG. 4 is a conceptual diagram illustrating an example of reference pictures and reference picture lists. In (a) of FIG. 4, a rectangle indicates a picture, an arrow indicates a reference relationship of a picture, a horizontal axis indicates time, each of I, P, and B in a rectangle indicates an intra-picture, a uni-prediction picture, a bi-prediction picture, and a number in a rectangle indicates a decoding order. As illustrated, the decoding order of the pictures is I0, P1, B2, B3, and B4, and the display order is I0, B3, B2, B4, and P1. (b) of FIG. 4 indicates an example of reference picture lists. The reference picture list is a list to represent a candidate of a reference picture, and one picture (slice) may include one or more reference picture lists. In the illustrated example, a target picture B3 includes two reference picture lists, i.e., a L0 list RefPicList0 and a L1 list RefPicList1. In a case that a target picture is B3, the reference pictures are I0, P1, and B2, and the reference pictures includes these pictures as elements. For an individual prediction unit, which picture in a reference picture list RefPicListX is actually referred to is specified with a reference picture index refIdxLX. The diagram indicates an example where reference pictures P1 and B2 are referred to by refIdxL0 and refIdxL1.

Merge Prediction and AMVP Prediction

Decoding (coding) methods of prediction parameters include a merge prediction (merge) mode and an Adaptive Motion Vector Prediction (AMVP) mode, and merge flag merge_flag is a flag to identify these. The merge mode is a mode to derive from prediction parameters of neighboring PUs already processed without including a prediction list utilization flag predFlagLX (or an inter prediction indicator inter_pred_idc), a reference picture index refIdxLX, and a motion vector mvLX in coded data. The AMVP mode is a mode to include an inter prediction indicator inter_pred_idc, a reference picture index refIdxLX, a motion vector mvLX in coded data. Note that, the motion vector mvLX is coded as a prediction vector index mvp_LX_idx identifying a prediction vector mvpLX and a difference vector mvdLX.

The inter prediction indicator inter_pred_idc is a value indicating a type and the number of reference pictures, and takes any value of PRED_L0, PRED_L1 and PRED_BI. PRED_L0 and PRED_L1 indicate to uses reference pictures managed in the reference picture list of the L0 list and the L1 list respectively, and indicate to use one reference picture (uni-prediction). PRED_BI indicates to use two reference pictures (bi-prediction BiPred), and use reference pictures managed in the L0 list and the L1 list. The prediction vector index mvp_LX_idx is an index indicating a prediction vector, and the reference picture index refIdxLX is an index indicating reference pictures managed in the reference picture list. Note that LX is a description method used in a case of not distinguishing the L0 prediction and the L1 prediction, and distinguishes parameters for the L0 list and parameters for the L1 list by replacing LX with L0 and L1.

The merge index merge_idx is an index to indicate to use which prediction parameter as a prediction parameter of a decoding target PU among prediction parameter candidates (merge candidates) derived from PUs of which the processing is completed.

Motion Vector

The motion vector mvLX indicates a gap quantity between blocks in two different pictures. A prediction vector and a difference vector related to the motion vector mvLX is referred to as a prediction vector mvpLX and a difference vector mvdLX respectively. Inter Prediction indicator inter_pred_idc and Prediction List Utilization Flag predFlagLX A relationship between an inter prediction indicator inter_pred_idc and prediction list utilization flags predFlagL0 and predFlagL1 are as follows, and those can be transformed mutually.

$$\text{inter\_pred\_idc} = (\text{predFlagL1} << 1) + \text{predFlagL0}$$

$$\text{predFlagL0} = \text{inter\_pred\_idc} \,\&\, 1$$

$$\text{predFlagL1} = \text{inter\_pred\_idc} >> 1$$

Note that an inter prediction parameter may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.

Determination of Bi-Prediction biPred

A flag biPred of whether or not a bi-prediction BiPred can be derived from whether or not two prediction list utilization flags are both 1. For example, the flag can be derived by the following equation.

$$\text{biPred} = (\text{predFlagL0} == 1 \,\&\&\, \text{predFlagL1} == 1)$$

The flag biPred can be also derived from whether an inter prediction indicator is a value indicating to use two prediction lists (reference pictures). For example, the flag can be derived by the following equation.

$$\text{biPred} = (\text{inter\_pred\_idc} == \text{PRED\_BI})?1:0$$

The above described equation can be also expressed with the following equation.

$$\text{biPred} = (\text{inter\_pred\_idc} == \text{PRED\_BI})$$

Note that, for example, PRED_BI can use the value of 3.

Intra Prediction Mode

Luminance intra prediction modes IntraPredModeY include 67 modes, and corresponds to a planar prediction (0), a DC prediction (1), and directional predictions (2 to 66). Chrominance intra prediction modes IntraPredModeC include 68 mode including a Colour Component Linear Mode (CCLM) added to the 67 modes described above. The CCLM is a mode in which a pixel value of a target pixel in a target color component is derived by a linear prediction with reference to a pixel value of another color component coded before the target color component. Note that the color component includes a luminance Y, a chrominance Cb, and a chrominance Cr. Different intra prediction modes may be assigned depending on chrominance and luminance, and prediction modes are coded or decoded in every CU or every PU.

Configuration of Image Decoding Device

Figure 5:
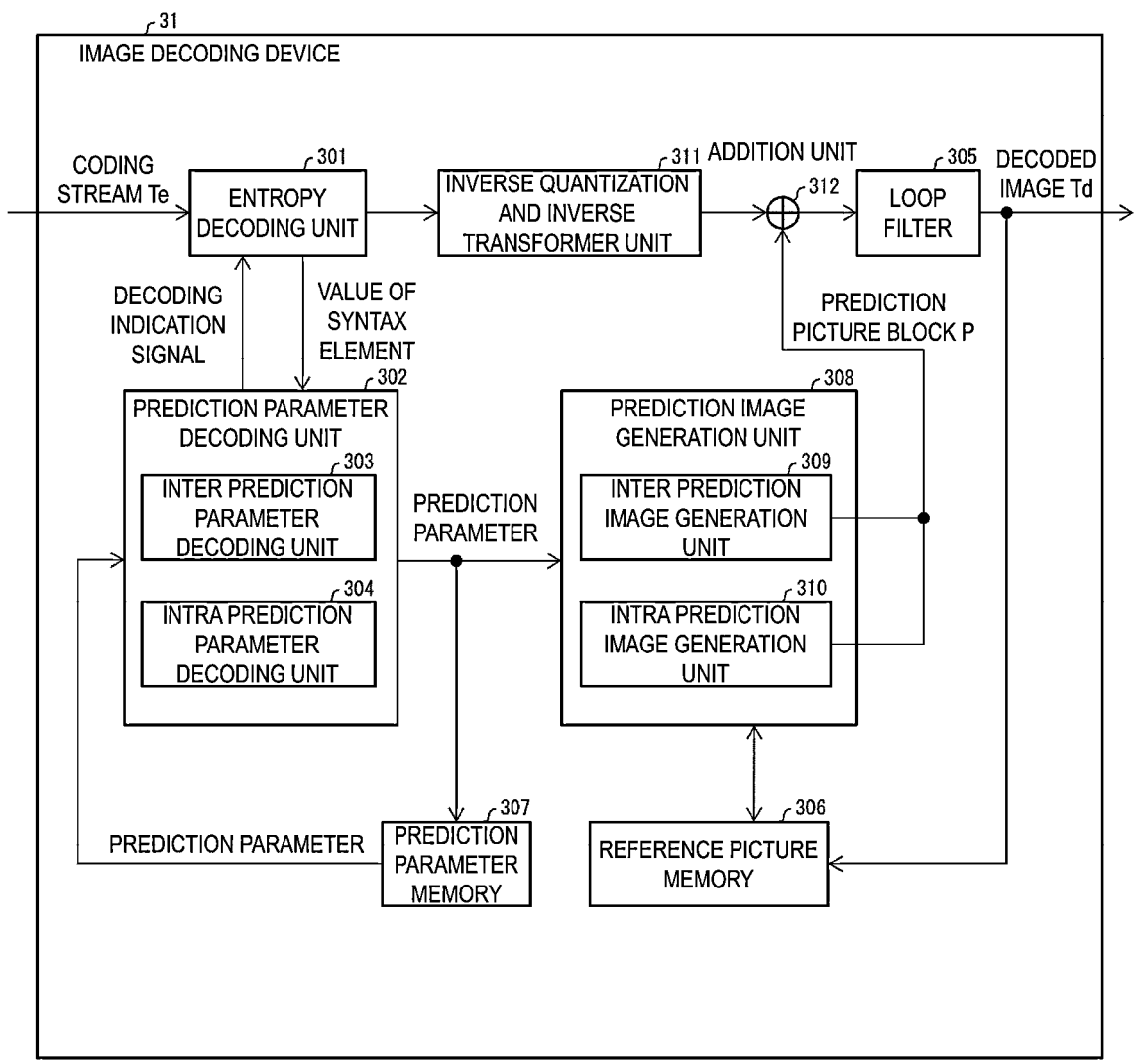
FIG. 5 is a block diagram illustrating a configuration of an image decoding device according to one embodiment of the present invention.

A configuration of the image decoding device 31 according to the present embodiment will now be described. FIG. 5 is a schematic diagram illustrating a configuration of the image decoding device 31 according to the present embodiment. The image decoding device 31 includes an entropy decoding unit 301, a prediction parameter decoding unit (a prediction image decoding device) 302, a loop filter 305, a reference picture memory 306, a prediction parameter memory 307, a prediction image generation unit (prediction image generation device) 308, an inverse quantization and inverse transformer unit 311, and an addition unit 312.

The prediction parameter decoding unit 302 includes an inter prediction parameter decoding unit 303 and an intra prediction parameter decoding unit 304. The prediction image generation unit 308 includes an inter prediction image generation unit 309 and an intra prediction image generation unit 310.

The entropy decoding unit 301 performs entropy decoding on the coding stream Te input from the outside, and separates and decodes individual codes (syntax elements). Separated codes include prediction parameters to generate a prediction image and residual information to generate a difference image and the like.

The entropy decoding unit 301 outputs a part of the separated codes to the prediction parameter decoding unit 302. For example, a part of the separated codes includes a prediction mode predMode, a PU split mode part_mode, a merge flag merge_flag, a merge index merge_idx, an inter prediction indicator inter_pred_idc, a reference picture index ref_Idx_LX, a prediction vector index mvp_LX_idx, and a difference vector mvdLX. The control of which code to decode is performed based on an indication of the prediction parameter decoding unit 302. The entropy decoding unit 301 outputs quantization coefficients to the inverse quantization and inverse transformer unit 311. These quantization coefficients are coefficients obtained by performing orthogonal transform (discrete cosine transform, discrete sine transform, and the like) on residual signals and quantizing the result in coding processing.

The inter prediction parameter decoding unit 303 decodes an inter prediction parameter with reference to a prediction parameter stored in the prediction parameter memory 307, based on a code input from the entropy decoding unit 301.

The inter prediction parameter decoding unit 303 outputs a decoded inter prediction parameter to the prediction image generation unit 308, and also stores the decoded inter prediction parameter in the prediction parameter memory 307.

The intra prediction parameter decoding unit 304 decodes an intra prediction parameter with reference to a prediction parameter stored in the prediction parameter memory 307, based on a code input from the entropy decoding unit 301. The intra prediction parameter is a parameter used in a processing to predict a CU in one picture, for example, an intra prediction mode IntraPredMode. The intra prediction parameter decoding unit 304 outputs a decoded intra prediction parameter to the prediction image generation unit 308, and also stores the decoded intra prediction parameter in the prediction parameter memory 307.

The loop filter 305 applies a filter such as a deblocking filter, a sample adaptive offset (SAO), and an adaptive loop filter (ALF) on a decoded image of a CU generated by the addition unit 312.

The reference picture memory 306 stores a decoded image of a CU generated by the addition unit 312 in a position prescribed for each picture and CU of a decoding target.

The prediction parameter memory 307 stores a prediction parameter in a position prescribed for each picture and prediction unit (or a subblock, a fixed size block, and a pixel) of a decoding target. Specifically, the prediction parameter memory 307 stores an inter prediction parameter decoded by the inter prediction parameter decoding unit 303, an intra prediction parameter decoded by the intra prediction parameter decoding unit 304 and a prediction mode predMode separated by the entropy decoding unit 301. For example, inter prediction parameters stored include a prediction list utilization flag predFlagLX (an inter prediction indicator inter_pred_idc), a reference picture index refIdxLX, and a motion vector mvLX.

To the prediction image generation unit 308, a prediction mode predMode input from the entropy decoding unit 301 is input, and also a prediction parameter is input from the prediction parameter decoding unit 302. The prediction image generation unit 308 reads a reference picture from the reference picture memory 306. The prediction image generation unit 308 generates a prediction image of a PU by using a prediction parameter input and a reference picture read, with a prediction mode indicated by the prediction mode predMode.

Here, in a case that the prediction mode predMode indicates an inter prediction mode, the inter prediction image generation unit 309 generates a prediction image of a PU by an inter prediction by using an inter prediction parameter input from the inter prediction parameter decoding unit 303 and a read reference picture.

For a reference picture list (an L0 list or an L1 list) where a prediction list utilization flag predFlagLX is 1, the inter prediction image generation unit 309 reads a reference picture block from the reference picture memory 306 in a position indicated by a motion vector mvLX, based on a decoding target PU, from reference pictures indicated by the reference picture index refIdxLX. The inter prediction image generation unit 309 performs a prediction based on a read reference picture block and generates a prediction image of a PU. The inter prediction image generation unit 309 outputs the generated prediction image of the PU to the addition unit 312.

In a case that the prediction mode predMode indicates an intra prediction mode, the intra prediction image generation unit 310 performs an intra prediction by using an intra prediction parameter input from the intra prediction parameter decoding unit 304 and a read reference picture. Specifically, the intra prediction image generation unit 310 reads an adjacent PU, which is a picture of a decoding target, in a prescribed range from a decoding target PU among PUs already decoded, from the reference picture memory 306. The prescribed range is, for example, any of adjacent PUs in left, top left, top, and top right in a case that a decoding target PU moves in order of so-called raster scan sequentially, and varies according to the intra prediction mode. The order of the raster scan is an order to move sequentially from the left edge to the right edge in each picture for each row from the top edge to the bottom edge.

The intra prediction image generation unit 310 performs a prediction in a prediction mode indicated by the intra prediction mode IntraPredMode for a read adjacent PU, and generates a prediction image of a PU. The intra prediction image generation unit 310 outputs the generated prediction image of the PU to the addition unit 312.

In a case that the intra prediction parameter decoding unit 304 derives different intra prediction modes depending on the luminance and chrominance, the intra prediction image generation unit 310 generates a prediction image of a PU of luminance by any of a planar prediction (0), a DC prediction (1), and directional predictions (2 to 66) depending on the luminance prediction mode IntraPredModeY, and generates a prediction image of a PU of chrominance by any of a planar prediction (0), a DC prediction (1), directional predictions (2 to 66), and LM mode (67) depending on the chrominance prediction mode IntraPredModeC.

Figure 7:
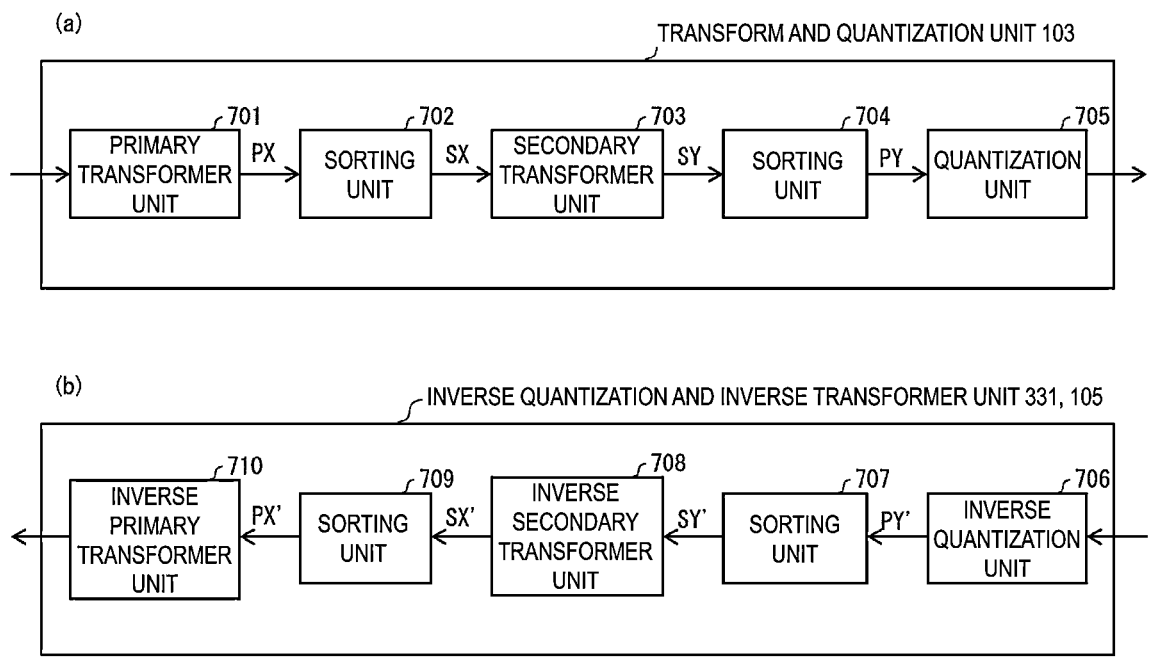
FIG. 7 is a detailed block diagram of a transform and quantization unit and an inverse quantization and inverse transformer unit.

A detailed block diagram of the inverse quantization and inverse transformer unit 311 is illustrated in FIG. 7. FIG. 7(b) illustrates the inverse quantization and inverse transformer unit 311, which includes an inverse quantization unit 706, a sorting unit 707, an inverse secondary transformer unit 708, a sorting unit 709, and an inverse primary transformer unit 710. The inverse quantization unit 706 performs inverse quantization on quantization transform coefficients input from the entropy decoding unit 301. The sorting unit 707 (subset extraction unit, coefficient assignment unit) extracts coefficients for performing inverse secondary transform from among outputs of the inverse quantization unit 706, and sorts the coefficients into a format for inputting to the inverse secondary transformer unit 708. The inverse secondary transformer unit 708 performs inverse secondary transform on output of the sorting unit 707. Details will be described below. The sorting unit 709 (subset storage unit, coefficient assignment unit) sorts output of the inverse secondary transformer unit 708 and output of the inverse quantization unit 706 where inverse secondary transform has not been performed together into a format for inputting to the inverse primary transformer unit 710. The inverse primary transformer unit 710 performs inverse primary transform on output of the sorting unit 709, and calculates prediction residual signals. The inverse quantization and inverse transformer unit 311 outputs the calculated residual signals to the addition unit 312.

The addition unit 312 adds a prediction image of a PU input from the inter prediction image generation unit 309 or the intra prediction image generation unit 310 and a residual signal input from the inverse quantization and inverse transformer unit 311 for each pixel, and generates a decoded image of a PU. The addition unit 312 stores the generated decoded image of a PU in the reference picture memory 306, and outputs a decoded image Td where the generated decoded image of the PU is integrated for each picture to the outside.

Configuration of Image Encoding Device

Figure 6:
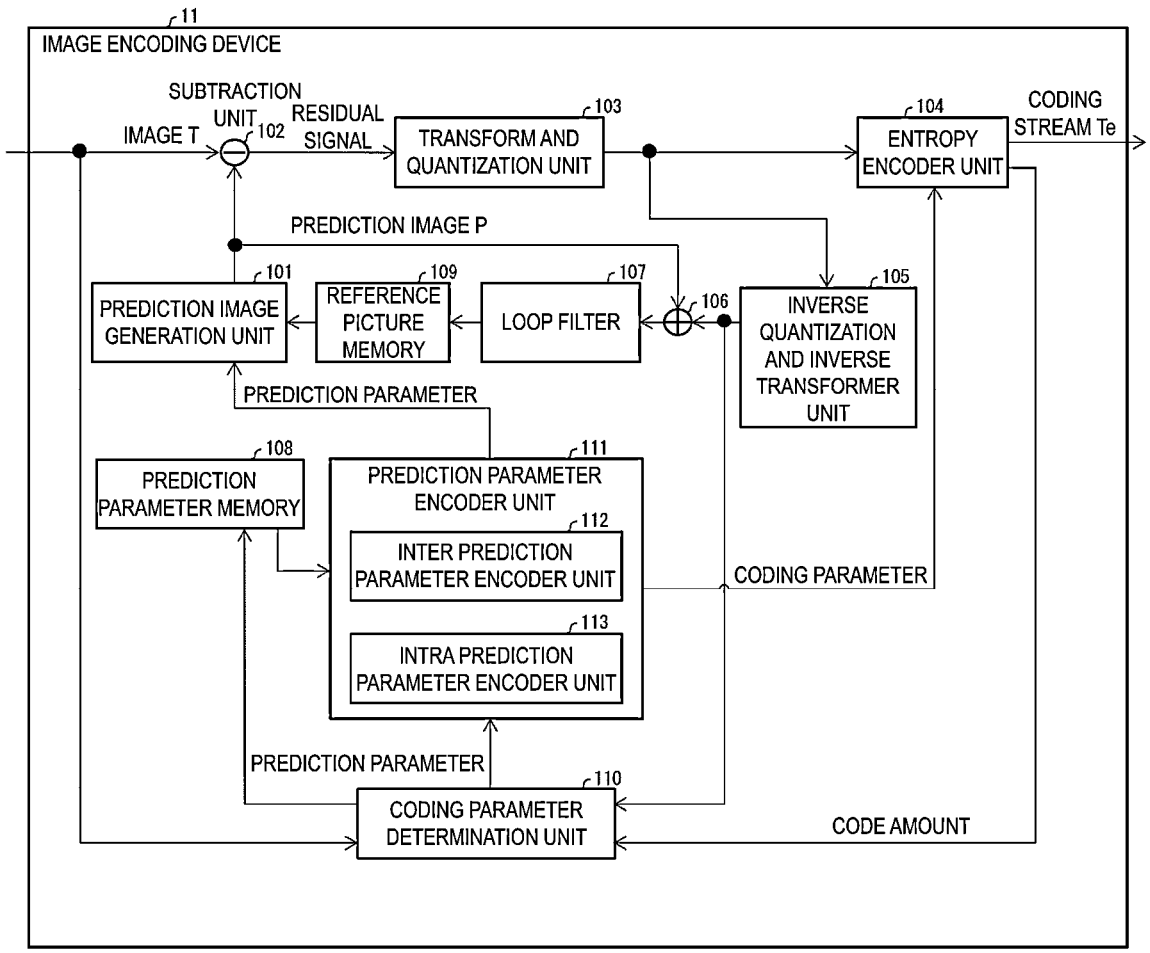
FIG. 6 is a block diagram illustrating a configuration of an image encoding device according to one embodiment of the present invention.

A configuration of the image encoding device 11 according to the present embodiment will now be described. FIG. 6 is a block diagram illustrating a configuration of the image encoding device 11 according to the present embodiment. The image encoding device 11 includes a prediction image generation unit 101, a subtraction unit 102, a transform and quantization unit 103, an entropy encoder unit 104, an inverse quantization and inverse transformer unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, and a prediction parameter encoder unit 111. The prediction parameter encoder unit 111 includes an inter prediction parameter encoder unit 112 and an intra prediction parameter encoder unit 113.

For each picture of an image T, the prediction image generation unit 101 generates a prediction image P of a prediction unit PU for each coding unit CU that is a region where the picture is split. Here, the prediction image generation unit 101 reads a block that has been decoded from the reference picture memory 109, based on a prediction parameter input from the prediction parameter encoder unit 111. For example, in a case of an inter prediction, the prediction parameter input from the prediction parameter encoder unit 111 is a motion vector. The prediction image generation unit 101 reads a block in a position in a reference image indicated by a motion vector starting from a target PU. In a case of an intra prediction, the prediction parameter is, for example, an intra prediction mode. The prediction image generation unit 101 reads a pixel value of an adjacent PU used in an intra prediction mode from the reference picture memory 109, and generates the prediction image P of a PU. The prediction image generation unit 101 generates the prediction image P of a PU by using one prediction scheme among multiple prediction schemes for the read reference picture block. The prediction image generation unit 101 outputs the generated prediction image P of a PU to the subtraction unit 102.

Note that the prediction image generation unit 101 performs operations same as the prediction image generation unit 308 already described, so description thereof will be omitted here.

The prediction image generation unit 101 generates the prediction image P of a PU, based on a pixel value of a reference block read from the reference picture memory, by using a parameter input by the prediction parameter encoder unit. The prediction image generated by the prediction image generation unit 101 is output to the subtraction unit 102 and the addition unit 106.

The subtraction unit 102 subtracts a signal value of the prediction image P of a PU input from the prediction image generation unit 101 from a pixel value of a corresponding PU of the image T, and generates residual signals. The subtraction unit 102 outputs the generated residual signals to the transform and quantization unit 103.

A detailed block diagram of the transform and quantization unit 103 is illustrated in FIG. 7. FIG. 7(a) illustrates the transform and quantization unit 103, which includes a primary transformer unit 701, a sorting unit 702, a secondary transformer unit 703, a sorting unit 704, and a quantization unit 705. The primary transformer unit 701 performs primary transform on prediction residual signals input from the subtraction unit 102, and calculates primary transform coefficients. The sorting unit 702 sorts output of the primary transformer unit 701 into a format for inputting to the secondary transformer unit 703. This sorting is an inverse relationship in input and output with the sorting of the sorting unit 709 of the inverse quantization and inverse transformer unit 311. The secondary transformer unit 703 performs secondary transform on output of the sorting unit 702. Details will be described below. The sorting unit 704 sorts output of the secondary transformer unit 703 and output of the primary transformer unit 701 where secondary transform has not been performed together into a format for inputting to the quantization unit 705. This sorting is an inverse relationship in input and output with the sorting of the sorting unit 707 of the inverse quantization and inverse transformer unit 311. The quantization unit 705 quantizes output of the sorting unit 704 and calculates quantization coefficients. The transform and quantization unit 103 outputs the calculated quantization coefficients to the entropy encoder unit 104 and the inverse quantization and inverse transformer unit 105.

The primary transform generally performs separable transform on prediction residuals in every CU or every TU. To perform transform with mutually independent transform axes suitable for the characteristics of the prediction residuals, a transform base may be selected form multiple transform bases, such as DCT-2, DCT-5, DCT-8, DST-1, DST-7, and the like. The inverse primary transform described in the image decoding device is inverse transform of primary transform, and uses a base for inverse transform corresponding to the transform base used in the primary transform.

Next, secondary transform and inverse transform thereof will be described.

The secondary transform is transform applied to coefficients after the primary transform. In general, the primary transform is realized by separable transform, and for example, is not optimal for diagonal direction components, and the energy is not efficiently concentrated. In such a case, the energy can be concentrated in specific components by performing transform effective for components in the diagonal direction again on the primary transform coefficients.

Figure 10:
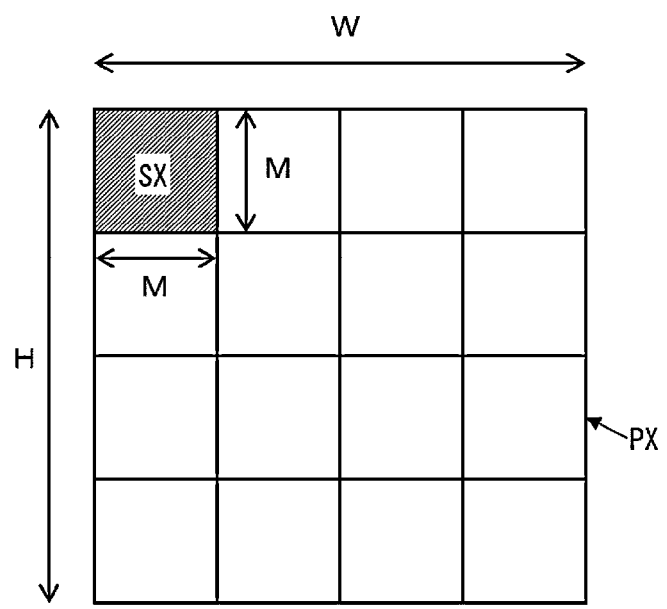
FIG. 10 is a diagram illustrating a target region of secondary transform.

The secondary transform and the inverse secondary transform procedure are illustrated with reference to FIG. 7. For a W*H block PX having the width W and the height H in which the primary transform coefficients after the primary transform (every CU) is stored, an M*M array SX having the width M and the height M including the upper left region of the PX (corresponding to the hatched portion in FIG. 10) is subjected to the secondary transform. In a case that the secondary target is an M*M block, it is simply referred to as "M*M block transform". It is natural to express in order of the vertical direction and the horizontal direction in the matrix representation, but hereinafter, in accordance with expressing the size of a block as width*height, a W*H block PX is denoted as a W*H array PX (with each component of the array being PXw,h w=0 . . . W−1, h=0 . . . H−1). Where W, H are the width and height of a CU (TU in a case that a CU is divided and transformed) and M is equal to or less than W (M<=W) and M is equal to or less than H (M<=H). Note that the M may be configured in accordance with the CU size, such as M=8 in a case that the CU is 8×8 or greater, and otherwise M=4. The secondary transform is performed on the entire primary transform coefficients or some of the low frequency components. The output of the secondary transform is denoted as M*M array SY (where each component of the array is denoted as SYm,n) and is stored in an M×M region located on top left of a W*H array PY (where each component of the array is denoted PYw,h) input to the quantization unit 705. The primary transform coefficients PX are stored in the remaining region of the W*H array PY input to the quantization unit 705.

In a case that separable two-dimensional transform such as ROtational Transform (ROT) is used for the secondary transform, processing of the sorting unit 702, the secondary transformer unit 703, and the sorting unit 704 is described below.

Sorting unit 702: $SXm, n = PXm, n(0 <= m, n < M)$ (Formula 1)

Secondary transformer unit 703: $SY = [ROTf][SX]T[ROTf]$ (Formula 2)

Sorting unit 704: $PYw, h = SYw, h(0 <= w, h < M)$ (Formula 3)

$= PXw, h$(other than the above)

Equation 1

$$PX = \begin{bmatrix} PX_{0,0} & PX_{1,0} & \cdots & PX_{W-1,0} \\ PX_{0,1} & PX_{1,1} & & PX_{W-1,1} \\ \vdots & & \ddots & \vdots \\ PX_{0,H-1} & PX_{1,H-1} & \cdots & PX_{W-1,H-1} \end{bmatrix}$$

$$SX = \begin{bmatrix} SX_{0,0} & SX_{1,0} & \cdots & SX_{M-1,0} \\ SX_{0,1} & SX_{1,1} & & SX_{M-1,1} \\ \vdots & & \ddots & \vdots \\ SX_{0,M-1} & SX_{1,M-1} & \cdots & SX_{M-1,M-1} \end{bmatrix}$$

$$SY = \begin{bmatrix} SY_{0,0} & SY_{1,0} & \cdots & SY_{M-1,0} \\ SY_{0,1} & SY_{1,1} & & SY_{M-1,1} \\ \vdots & & \ddots & \vdots \\ SY_{0,M-1} & SY_{1,M-1} & \cdots & SY_{M-1,M-1} \end{bmatrix}$$

$$PY = \begin{bmatrix} PY_{0,0} & PY_{1,0} & \cdots & PY_{W-1,0} \\ PY_{0,1} & PY_{1,1} & & PY_{W-1,1} \\ \vdots & & \ddots & \vdots \\ PY_{0,H-1} & PY_{1,H-1} & \cdots & PY_{W-1,H-1} \end{bmatrix}$$

Where [ROTf] is an array of the ROT transform bases. In Formula 2, the two-dimensional arrays of ROTf, SX are considered matrixes and the product of the matrixes is calculated (hereinafter, an array is considered as a matrix to calculate). T [X] represents a transpose of a matrix [X]. The separable two-dimensional transform of Formula 2 may also be realized by applying one-dimensional transform, which is a product of the transform base matrix, twice to the input matrix. In this case, the second transform is performed with a matrix obtained by transpose of the output of the first transform as an input.

The ROT is transform of the high energy concentration of the diagonal direction components among separable transforms, but a non-separable transform with higher energy concentration than separable transform may be used as the secondary transform instead of ROT. In this case, in addition to the above-described processing, the sorting unit 702 performs processing to arrange a two-dimensional array into a one-dimensional array. Furthermore, in addition to the above-described processing, the sorting unit 704 performs processing to arrange a one-dimensional array into a two-dimensional array.

In a case that non-separable transform is used for the secondary transform, processing of the sorting unit 702, the secondary transformer unit 703, and the sorting unit 704 is described below. Here, the M*M array SX and the M*M array SY are both one-dimensional arrays.

Sorting unit 702: $SXj = PXm,$ (Formula 4)

$n(m = j\%M, n = j/M(j = 0 \ldots M*M - 1))$

Secondary transformer unit 703: $SY = [Tf][SX]$ (Formula 5)

Sorting unit 704: $PYw, h = SYj(w = j\%M,$ (Formula 6)

$h = j/M(j = 0 \ldots M*M - 1))$ $PXw, h$(other than the above)

Equation 2

$$SX = \begin{bmatrix} SX_{0,0} & SX_{1,0} & \cdots & SX_{M-1,0} \\ SX_{0,1} & SX_{1,1} & \cdots & SX_{M-1,1} \\ \vdots & \vdots & \vdots & \vdots \\ SX_{0,M-1} & SX_{1,M-1} & \cdots & SX_{M-1,M-1} \end{bmatrix}^T$$

$$SY = \begin{bmatrix} SY_{0,0} & SY_{1,0} & \cdots & SY_{M-1,0} \\ SY_{0,1} & SY_{1,1} & \cdots & SY_{M-1,1} \\ \vdots & \vdots & \vdots & \vdots \\ SY_{0,M-1} & SY_{1,M-1} & \cdots & SY_{M-1,M-1} \end{bmatrix}^T$$

Where Tf is non-separable transform (one-dimensional transform) array, and may be a one-dimensional DCT-2, DCT-5, DCT-8, DST-1, DST-7, Hypercube-Givens Transform (HyGT), and the like. Some examples of ROT and non-separable transforms are illustrated below.

Equation 3

$R(\alpha_1, \alpha_2, \alpha_3) =$ $$\begin{bmatrix} \cos\alpha_1\cos\alpha_3 - \sin\alpha_1\cos\alpha_2\sin\alpha_3 & -\sin\alpha_1\cos\alpha_3 - \cos\alpha_1\cos\alpha_2\sin\alpha_3 & \sin\alpha_2\sin\alpha_3 \\ \cos\alpha_1\sin\alpha_3 + \sin\alpha_1\cos\alpha_2\cos\alpha_3 & -\sin\alpha_1\sin\alpha_3 + \cos\alpha_1\cos\alpha_2\cos\alpha_3 & -\sin\alpha_2\cos\alpha_3 \\ \sin\alpha_1\sin\alpha_2 & \cos\alpha_1\sin\alpha_2 & \cos\alpha_2 \end{bmatrix}$$

IN CASE OF $M = 4$ $$ROT_V(\alpha_1, \alpha_2, \alpha_3) = \begin{bmatrix} & & & 0 \\ R(\alpha_1, \alpha_2, \alpha_3) & & & 0 \\ & & & 0 \\ 0 & 0 & 0 & 1 \end{bmatrix}$$

$$ROT_H(\beta_1, \beta_2, \beta_3) = \begin{bmatrix} & & & 0 \\ R(\beta_1, \beta_2, \beta_3) & & & 0 \\ & & & 0 \\ 0 & 0 & 0 & 1 \end{bmatrix}$$

IN CASE OF $M = 8$ $$ROT_V(\alpha_1, \alpha_2, \alpha_3) = \begin{bmatrix} & & & & & & 0 & 0 \\ R(\alpha_1, \alpha_2, \alpha_3) & & & 0 & & & 0 & 0 \\ & & & & & & 0 & 0 \\ & & & & & & 0 & 0 \\ & 0 & & & R(\alpha_1, \alpha_2, \alpha_3) & & 0 & 0 \\ & & & & & & 0 & 0 \\ 0 & 0 & 0 & & 0 & 0 & 0 & 1 & 0 \\ 0 & 0 & 0 & & 0 & 0 & 0 & 0 & 1 \end{bmatrix}$$

-continued $$ROT_H(\beta_1, \beta_2, \beta_3) = \begin{bmatrix} R(\beta_1, \beta_2, \beta_3) & 0 & \begin{matrix} 0 & 0 \\ 0 & 0 \\ 0 & 0 \end{matrix} \\ 0 & R(\beta_1, \beta_2, \beta_3) & \begin{matrix} 0 & 0 \\ 0 & 0 \\ 0 & 0 \end{matrix} \\ \begin{matrix} 0 & 0 & 0 \\ 0 & 0 & 0 \end{matrix} & \begin{matrix} 0 & 0 & 0 \\ 0 & 0 & 0 \end{matrix} & \begin{matrix} 1 & 0 \\ 0 & 1 \end{matrix} \end{bmatrix}$$

$$T_i(j) = k_0 \cdot \sqrt{\frac{2}{M}} \cdot \cos\frac{\pi \cdot i \cdot (2j+1)}{2M} \quad k_0 = \begin{cases} \sqrt{\frac{2}{M}} & (i=0) \\ 1 & (i \neq 0) \end{cases} \quad \text{DCT-2}$$

$$T_i(j) = k_0 \cdot k_1 \cdot \sqrt{\frac{2}{2M-1}} \cdot \cos\frac{2\pi \cdot i \cdot j}{2M-1} \quad \text{DCT-5}$$

$$k_1 = \begin{cases} \sqrt{\frac{2}{M}} & (j=0) \\ 1 & (j \neq 0) \end{cases}$$

$$T_i(j) = \sqrt{\frac{4}{2M+1}} \cdot \cos\frac{\pi \cdot (2i+1) \cdot (2j+1)}{4M+2} \quad \text{DCT-8}$$

$$T_i(j) = \sqrt{\frac{2}{M+1}} \cdot \sin\frac{\pi \cdot (i+1) \cdot (j+1)}{M+1} \quad \text{DST-1}$$

$$T_i(j) = \sqrt{\frac{4}{2M+1}} \cdot \sin\frac{\pi \cdot (2i+1) \cdot (j+1)}{2M+1} \quad \text{DST-7}$$

FIG. 11(a) is a flowchart illustrating operations of the transform and quantization unit 103 in FIG. 5.

The primary transformer unit 701 performs the primary transform on the prediction residuals with every CU (S1101). The sorting unit 702 compares the width W and height H of the CU to a predetermined threshold TH (S1102). In a case that either one of W and H is less than the threshold TH, the sorting unit 702 sets to the secondary transform size M as M1 (M=M1) (S1103), or otherwise M as M2 (M=M2) (S1104). Here M1 is less than M2 (M1<M2). It is desirable that the M1 and M2 are a power of two. As illustrated in Formula 1 or Formula 4 above, the sorting unit 702 sets the M*M primary transform coefficients as the input SX to the secondary transformer unit 703 (S1105). The secondary transformer unit 703 applies separable transform illustrated in Formula 2 or non-separable transform illustrated in Formula 5 to the input M*M primary transform coefficients, and performs the secondary transform (S1106). As illustrated in Formula 3 or Formula 6 above, the sorting unit 704 sets the primary transform coefficients and the secondary transform coefficients as an input PY to the quantization unit 705 (S1107). The quantization unit 705 performs quantization on the transform coefficients PY (S1108).

Next, the inverse secondary transform will be described. As illustrated in FIG. 7(b), for the W*H array PY'(where each component of the array is denoted as PY'w,h), in which output of the inverse quantization unit 706 is stored, the M*M array SY'(where each component of the array is denoted as SY'm,n) located on the top left of PY' is the target of the inverse secondary transform. Here, M is equal to or less than W (M<=W) and M is equal to or less than H (M<=H). The output of the inverse secondary transform, an M*M array SX' (where each component of the array is denoted as SX'm,n), is stored in an M×M region located on the top left of the W*H array PX'(where each component of the array is denoted as PX'w,h) input to the inverse primary transformer unit 710. The output PY' of the inverse quantization unit 706 that has not been inverse secondary transformed is stored in the remaining region of the W*H array PX' input to the inverse primary transformer unit 710.

In a case that separable two-dimensional transform such as ROtational Transform (ROT) is used for the secondary transform, processing of the sorting unit 707, the inverse secondary transformer unit 708, and the sorting unit 709 is described below.

Sorting unit 707: $SY'm, n = PY'm, n(0 <= m, n < M)$ (Formula 7)

Inverse secondary transformer unit 708: $SX' =$ (Formula 8)

$$T[ROTb][SY'][ROTb]$$

Sorting unit 709: $PX'w, h = SX'w, h(0 <= w, h < M)$ (Formula 9)
$= PY'w, h(\text{other than the above})$ Equation 4

$$PY' = \begin{bmatrix} PY'_{0,0} & PY'_{1,0} & \cdots & PY'_{W-1,0} \\ PY'_{0,1} & PY'_{1,1} & & PY'_{W-1,1} \\ \vdots & & \ddots & \vdots \\ PY'_{0,H-1} & PY'_{1,H-1} & \cdots & PY'_{W-1,H-1} \end{bmatrix}$$

$$SY' = \begin{bmatrix} SY'_{0,0} & SY'_{1,0} & \cdots & SY'_{M-1,0} \\ SY'_{0,1} & SY'_{1,1} & & SY'_{M-1,1} \\ \vdots & & \ddots & \vdots \\ SY'_{0,M-1} & SY'_{1,M-1} & \cdots & SY'_{M-1,M-1} \end{bmatrix}$$

$$SX' = \begin{bmatrix} SX'_{0,0} & SX'_{1,0} & \cdots & SX'_{M-1,0} \\ SX'_{0,1} & SX'_{1,1} & & SX'_{M-1,1} \\ \vdots & & \ddots & \vdots \\ SX'_{0,M-1} & SX'_{1,M-1} & \cdots & SX'_{M-1,M-1} \end{bmatrix}$$

$$PX' = \begin{bmatrix} PX'_{0,0} & PX'_{1,0} & \cdots & PX'_{W-1,0} \\ PX'_{0,1} & PX'_{1,1} & & PX'_{W-1,1} \\ \vdots & & \ddots & \vdots \\ PX'_{0,H-1} & PX'_{1,H-1} & \cdots & PX'_{W-1,H-1} \end{bmatrix}$$

Where [ROTb] is an array of the inverse ROT transform bases and T [X] represents the transpose of a matrix [X].

In a case that non-separable transform is used instead of ROT as the secondary transform, in addition to the above-described processing, the sorting unit 707 performs processing to arrange a two-dimensional array into a one-dimensional array. Furthermore, in addition to the above-described processing, the sorting unit 709 performs processing to arrange a one-dimensional array into a two-dimensional array.

In a case that non-separable transform is used for the secondary transform, processing of the sorting unit 707, the inverse secondary transformer unit 708, and the sorting unit 709 is described below. Here, the array SX' and the array SY' are both one-dimensional arrays having M*M size.

Sorting unit 707: $SY'j = PY'm,$ (Formula 10)

$n(m = j\%M, n = j/M(j = 0 \ldots M*M - 1))$

Secondary transformer unit 708: $SX' = [Tb][SY']$ (Formula 11)

Sorting unit 709: $PX'w, h = SX'j(w = j\%M,$ (Formula 12)

$h = j/M(j = 0 \ldots M*M - 1))$ $= PY'w, h(\text{other than the above})$

-continued

Equation 5

$$SY' = \begin{bmatrix} SY'_{0,0} & SY'_{1,0} & \ldots & SY'_{M-1,0} \\ SY'_{0,1} & SY'_{1,1} & \ldots & SY'_{M-1,1} \\ \vdots & \vdots & \vdots & \vdots \\ SY'_{0,M-1} & SY'_{1,M-1} & \ldots & SY'_{M-1,M-1} \end{bmatrix}^T$$

$$SX' = \begin{bmatrix} SX'_{0,0} & SX'_{1,0} & \ldots & SX'_{M-1,0} \\ SX'_{0,1} & SX'_{1,1} & \ldots & SX'_{M-1,1} \\ \vdots & \vdots & \vdots & \vdots \\ SX'_{0,M-1} & SX'_{1,M-1} & \ldots & SX'_{M-1,M-1} \end{bmatrix}^T$$

Where [Tb] is an array of non-separable transform, and may be inverse transform such as the above-mentioned one-dimensional DCT-2, DCT-5, DCT-8, DST-1 DST-7, Hypercube-Givens Transform (HyGT), and the like.

FIG. 11(b) is a flowchart illustrating operations of the inverse quantization and inverse transformer unit 311 in FIG. 6 and the inverse quantization and inverse transformer unit 105 in FIG. 5.

The inverse quantization unit 706 performs inverse quantization on the quantization transform coefficients of the prediction residuals decoded by the entropy decoding unit 301 (S1109). The sorting unit 707 compares the width W and height H of the CU to a predetermined threshold TH (S1110). In a case that either one of W and H is less than the threshold TH, the sorting unit 707 sets the inverse secondary transform size M as M1 (M=M1) (S1111), and otherwise M as M2 (M=M2) (S1112). The sorting unit 707 extracts an M×M region as a region for the secondary transform using the M configured. Here, M1 and M2 are the same as those used in the flowchart of FIG. 11(a). As illustrated in Formula 7 or Formula 10 above, the sorting unit 707 sets the M*M transform coefficients as the input SY' to the inverse secondary transformer unit 708 (S1113). The inverse secondary transformer unit 708 applies separable transform illustrated in Formula 8 or non-separable transform illustrated in Formula 11 to the input M*M transform coefficients, and performs the inverse secondary transform (S1114). As illustrated in Formula 9 or Formula 12 above, the sorting unit 709 sets the primary transform coefficients as the input PX' to the inverse primary transformer unit 710 (S1115). The inverse primary transformer unit 710 performs the inverse primary transform on the transform coefficients PX'(S1116).

In the above, in a case that the thresholds TH is equal to 8, M1 may be configured to 4 (M1=4) and M2 may be configured to 8 (M2=8).

The secondary transform is applied in an intra prediction and selects an intra prediction mode iPred and transform to be applied for each CU by reference to an index nIdx. FIG. 12(a) is an example in which 35 types of transform sets TPRED are assigned to 67 types of intra prediction modes. One transform set is assigned three filters and specifies transform to be applied by using index nIdx illustrated in FIG. 12(b) (nIdx=1 to 3). In a case of nIdx=0, secondary transform is not applied.

To the entropy encoder unit 104, quantization coefficients are input from the transform and quantization unit 103, and prediction parameters are input from the prediction parameter encoder unit 111. For example, input prediction parameters include codes such as a reference picture index ref_Idx_LX, a prediction vector index mvp_LX_idx, a difference vector mvdLX, a prediction mode pred_mode_flag, and a merge index merge_idx.

The entropy encoder unit 104 performs entropy coding on input split information, prediction parameters, quantization transform coefficients, and the like to generate the coding stream Te, and outputs the generated coding stream Te to the outside.

The inverse quantization and inverse transformer unit 105 is the same as the inverse quantization and inverse transformer unit 311 (FIG. 5) in the image decoding device, and performs inverse quantization on quantization coefficients input from the transform and quantization unit 103 to calculate transform coefficients. The inverse quantization and inverse transformer unit 105 performs inverse transform on the calculated transform coefficient to calculate residual signals. The inverse quantization and inverse transformer unit 105 outputs the calculated residual signals to the addition unit 106.

The addition unit 106 adds signal values of the prediction image P of a PU input from the prediction image generation unit 101 and signal values of the residual signals input from the inverse quantization and inverse transformer unit 105 for each pixel, and generates a decoded image. The addition unit 106 stores the generated decoded image in the reference picture memory 109.

The loop filter 107 performs a deblocking filter, a sample adaptive offset (SAO), and an adaptive loop filter (ALF) on the decoded image generated by the addition unit 106.

The prediction parameter memory 108 stores the prediction parameters generated by the coding parameter determination unit 110 in a position prescribed for each picture and CU of a coding target.

The reference picture memory 109 stores the decoded image generated by the loop filter 107 in a position prescribed for each picture and CU of a coding target.

The coding parameter determination unit 110 selects one set among multiple sets of coding parameters. The coding parameters are the above-mentioned QTBT split parameters or prediction parameters or parameters to be a target of coding generated associated with these. The prediction image generation unit 101 generates the prediction image P of a PU by using each of the sets of these coding parameters.

The coding parameter determination unit 110 calculates an RD cost value indicating a volume of an information quantity and coding errors for each of the multiple sets. For example, the RD cost value is a sum of a code amount and a value of multiplying a coefficient λ by a square error. The code amount is an information quantity of the coding stream Te obtained by performing entropy coding on quantization residuals and coding parameters. The square error is a sum of pixels for square values of residual values of residual signals calculated in the subtraction unit 102. The coefficient 2 is a real number that is larger than a pre-configured zero. The coding parameter determination unit 110 selects a set of coding parameters by which the calculated RD cost value is minimized. With this configuration, the entropy encoder unit 104 outputs the selected set of coding parameters as the coding stream Te to the outside, and does not output sets of coding parameters that are not selected. The coding parameter determination unit 110 stores the determined coding parameters in the prediction parameter memory 108.

The prediction parameter encoder unit 111 derives a format for coding from parameters input from the coding parameter determination unit 110, and outputs the format to the entropy encoder unit 104. A derivation of a format for coding is, for example, to derive a difference vector from a motion vector and a prediction vector. The prediction parameter encoder unit 111 derives parameters necessary to generate a prediction image from parameters input from the coding parameter determination unit 110, and outputs the parameters to the prediction image generation unit 101. For example, parameters necessary to generate a prediction image are a motion vector of a subblock unit.

The inter prediction parameter encoder unit 112 derives inter prediction parameters such as a difference vector, based on prediction parameters input from the coding parameter determination unit 110. The inter prediction parameter encoder unit 112 includes a partly identical configuration to a configuration by which the inter prediction parameter decoding unit 303 (see FIG. 5 and the like) derives inter prediction parameters, as a configuration to derive parameters necessary for generation of a prediction image output to the prediction image generation unit 101. The intra prediction parameter encoder unit 113 includes a partly identical configuration to a configuration by which the intra prediction parameter decoding unit 304 (see FIG. 5 and the like) derives intra prediction parameters, as a configuration to derive prediction parameters necessary for generation of a prediction image output to the prediction image generation unit 101.

The intra prediction parameter encoder unit 113 derives a format for coding (for example, MPM_idx, rem_intra_luma_pred_mode, and the like) from the intra prediction mode IntraPredMode input from the coding parameter determination unit 110.

Figure 13:
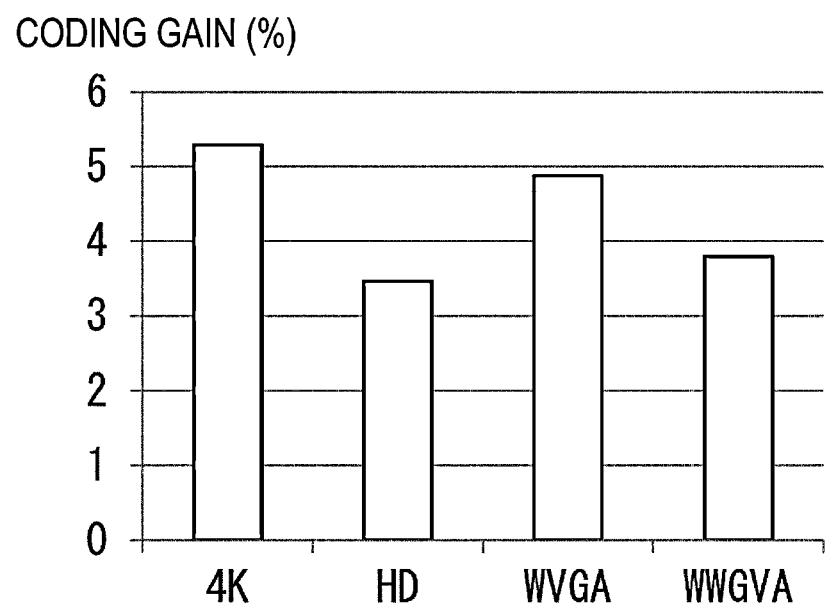
FIG. 13 is an example illustrating performance of secondary transform.

As illustrated in FIG. 13, the coding gain (reduction amount of code amount) due to secondary transform is large, but because new transform is applied, the amount of processing and memory used also increase. As described above, there is an attempt to suppress the increase in the amount of processing and the memory used, by limiting the secondary transform size to M×M, but this is not sufficient. Hereinafter, a technique for suppressing the increase in the amount of processing and the memory used will be described by further limiting the secondary transform size.

Conventionally, secondary transform has used square and 2 power sizes. The next large transform of M1*M1 is (M1*2)*(M1*2)=M1*M2*4, and the transform size increases four times. In the present invention, by configuring the size of the secondary transform to that having different sizes horizontally and vertically, as in M*N (M=M1*2, N=M1 or M=M1, N=M1*2), rather than M*M, the transform size is suppressed to two times, rather than four times. In particular, in non-separable transform, in a case that the number of inputs becomes four times, the base of the transform coefficients becomes 16 times, so suppressing the transform size to two times has a significant effect on the reduction of memory used. Additionally, by performing M*N transform only for input including low frequency components, rather than twice, the amount of processing and the amount of memory used can be further reduced. Since most of non-zero transform coefficients after primary transform is concentrated in the low frequency region, there is no significant decrease in the coding efficiency even in a case that secondary transform is not performed on the input on the high-frequency component side.

Figure 14:
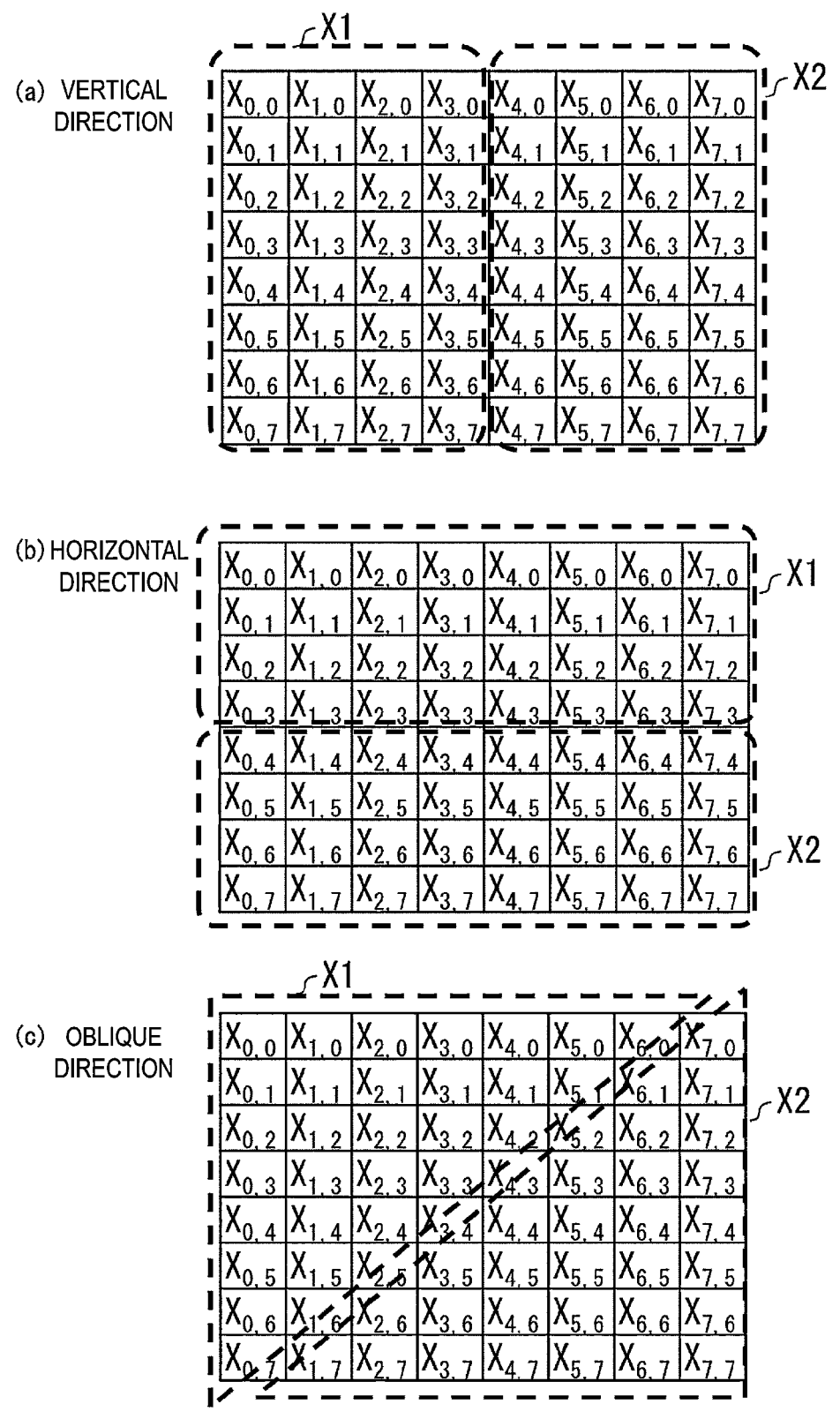

FIG. 14 is an example of regions of primary transform coefficients to be subjected to secondary transform. FIGS. 14(*a*) and 14(*b*) are example M*M block transform where M=8 (8*8 block transform) is replaced with M*N block transform with M=4, N=8 (4*8 block transform), or M=8, N=4 (8*4 block transform). FIG. 14(*a*) is an example of an input SX in a case that M*N (4*8) block transform is applied as secondary transform. In a case of separable secondary transform, the sorting unit 702 applies Formula 13 to the input SX. In a case of non-separable secondary transform, the sorting unit 702 applies Formula 14 to the input SX. Note that FIG. 14, Formula 13, and Formula 14 are common arrays, where X, Xm,n are read in substitution with SX, SXm,n.

Equation 6

$$X1 = \begin{bmatrix} X_{0,0} & X_{1,0} & X_{2,0} & X_{3,0} \\ X_{0,1} & X_{1,1} & X_{2,1} & X_{3,1} \\ X_{0,2} & X_{1,2} & X_{2,2} & X_{3,2} \\ X_{0,3} & X_{1,3} & X_{2,3} & X_{3,3} \\ X_{0,4} & X_{1,4} & X_{2,4} & X_{3,4} \\ X_{0,5} & X_{1,5} & X_{2,5} & X_{3,5} \\ X_{0,6} & X_{1,6} & X_{2,6} & X_{3,6} \\ X_{0,7} & X_{1,7} & X_{2,7} & X_{3,7} \end{bmatrix}$$ (Formula 13)

$$X2 = \begin{bmatrix} X_{4,0} & X_{5,0} & X_{6,0} & X_{7,0} \\ X_{4,1} & X_{5,1} & X_{6,1} & X_{7,1} \\ X_{4,2} & X_{5,2} & X_{6,2} & X_{7,2} \\ X_{4,3} & X_{5,3} & X_{6,3} & X_{7,3} \\ X_{4,4} & X_{5,4} & X_{6,4} & X_{7,4} \\ X_{4,5} & X_{5,5} & X_{6,5} & X_{7,5} \\ X_{4,6} & X_{5,6} & X_{6,6} & X_{7,6} \\ X_{4,7} & X_{5,7} & X_{6,7} & X_{7,7} \end{bmatrix}$$

$$X1 = [X_{0,0}\ X_{1,0}\ X_{2,0}\ X_{3,0}\ X_{0,1}\ X_{1,1}\ X_{2,1}\ X_{3,1}$$
$$X_{0,2}\ X_{1,2}\ X_{2,2}\ X_{3,2}\ X_{0,3}\ X_{1,3}\ X_{2,3}\ X_{3,3}$$
$$X_{0,4}\ X_{1,4}\ X_{2,4}\ X_{3,4}\ X_{0,5}\ X_{1,5}\ X_{2,5}\ X_{3,5}$$
$$X_{0,6}\ X_{1,6}\ X_{2,6}\ X_{3,6}\ X_{0,7}\ X_{1,7}\ X_{2,7}\ X_{3,7}]^T$$ (Formula 14)

$$X2 = [X_{4,0}\ X_{5,0}\ X_{6,0}\ X_{7,0}\ X_{4,1}\ X_{5,1}\ X_{6,1}\ X_{7,1}$$
$$X_{4,2}\ X_{5,2}\ X_{6,2}\ X_{7,2}\ X_{4,3}\ X_{5,3}\ X_{6,3}\ X_{7,3}$$
$$X_{4,4}\ X_{5,4}\ X_{6,4}\ X_{7,4}\ X_{4,5}\ X_{5,5}\ X_{6,5}\ X_{7,5}$$
$$X_{4,6}\ X_{5,6}\ X_{6,6}\ X_{7,6}\ X_{4,7}\ X_{5,7}\ X_{6,7}\ X_{7,7}]^T$$

FIG. 14(*b*) is an example of an input SX in a case that M*N (8*4) transform is applied as secondary transform. In a case of separable secondary transform, the sorting unit 702 sets the input SX to Formula 15, and in a case of non-separable secondary transform, the sorting unit 702 sets the input SX to Formula 16. Note that FIG. 14, Formula 15, and Formula 16 are common arrays, where X, Xm,n are read in substitution with SX, SXm,n.

Equation 7

$$X1 = \begin{bmatrix} X_{0,0} & X_{1,0} & X_{2,0} & X_{3,0} & X_{4,0} & X_{5,0} & X_{6,0} & X_{7,0} \\ X_{0,1} & X_{1,1} & X_{2,1} & X_{3,1} & X_{4,1} & X_{5,1} & X_{6,1} & X_{7,1} \\ X_{0,2} & X_{1,2} & X_{2,2} & X_{3,2} & X_{4,2} & X_{5,2} & X_{6,2} & X_{7,2} \\ X_{0,3} & X_{1,3} & X_{2,3} & X_{3,3} & X_{4,3} & X_{5,3} & X_{6,3} & X_{7,3} \end{bmatrix}$$ (Formula 15)

$$X2 = \begin{bmatrix} X_{0,4} & X_{1,4} & X_{2,4} & X_{3,4} & X_{4,4} & X_{5,4} & X_{6,4} & X_{7,4} \\ X_{0,5} & X_{1,5} & X_{2,5} & X_{3,5} & X_{4,5} & X_{5,5} & X_{5,6} & X_{7,6} \\ X_{0,6} & X_{1,6} & X_{2,6} & X_{3,6} & X_{4,6} & X_{5,6} & X_{6,6} & X_{7,6} \\ X_{0,7} & X_{1,7} & X_{2,7} & X_{3,7} & X_{4,7} & X_{5,7} & X_{6,7} & X_{7,7} \end{bmatrix}$$

$$X1 = [X_{0,0}\ X_{1,0}\ X_{2,0}\ X_{3,0}\ X_{4,0}\ X_{5,0}\ X_{6,0}\ X_{7,0}$$
$$X_{0,1}\ X_{1,1}\ X_{2,1}\ X_{3,1}\ X_{4,1}\ X_{5,1}\ X_{6,1}\ X_{7,1}$$
$$X_{0,2}\ X_{1,2}\ X_{2,2}\ X_{3,2}\ X_{4,2}\ X_{5,2}\ X_{6,2}\ X_{7,2}$$
$$X_{0,3}\ X_{1,3}\ X_{2,3}\ X_{3,3}\ X_{4,3}\ X_{5,3}\ X_{6,3}\ X_{7,3}]^T$$ (Formula 16)

$$X2 = [X_{0,4}\ X_{1,4}\ X_{2,4}\ X_{3,4}\ X_{4,4}\ X_{5,4}\ X_{6,4}\ X_{7,4}$$
$$X_{0,5}\ X_{1,5}\ X_{2,5}\ X_{3,5}\ X_{4,5}\ X_{5,5}\ X_{6,5}\ X_{7,5}$$
$$X_{0,6}\ X_{1,6}\ X_{2,6}\ X_{3,6}\ X_{4,6}\ X_{5,6}\ X_{6,6}\ X_{7,6}$$
$$X_{0,7}\ X_{1,7}\ X_{2,7}\ X_{3,7}\ X_{4,7}\ X_{5,7}\ X_{6,7}\ X_{7,7}]^T$$

The separable secondary transform and the secondary inverse transform are described below.

Secondary transformer unit 703: $SY = [ROTf\_N][SX]T[ROTf\_M]$ (Formula 17)

Inverse secondary transformer unit 708: $SX' = T[ROTb\_N][SY][ROTb\_M]$ (Formula 18)

Where "N" and "M" are vertical and horizontal sizes of the transform. That is, [ROTf_N] is an N*N array, and [ROTf M] is an M*M array.

FIG. 14(c) is an example of an input SX in a case that one-dimensional M*N (=32) transform is applied as secondary transform. In a case of non-separable secondary transform, the sorting unit 702 sets the input SX to Formula 19. Note that FIG. 14, and Formula 19 are common arrays, where X, Xm,n are read in substitution with SX, SXm,n.

Equation 8

$$X1 = \begin{bmatrix} X_{0,0} & X_{0,1} & X_{1,0} & X_{0,2} & X_{1,1} & X_{2,0} & X_{0,3} & X_{1,2} \\ X_{2,1} & X_{3,0} & X_{0,4} & X_{1,3} & X_{2,2} & X_{3,1} & X_{4,0} & X_{0,5} \\ X_{1,4} & X_{2,3} & X_{3,2} & X_{4,1} & X_{5,0} & X_{0,6} & X_{1,5} & X_{2,4} \\ X_{3,3} & X_{4,2} & X_{5,1} & X_{6,0} & X_{0,7} & X_{1,6} & X_{2,5} & X_{3,4} \end{bmatrix}^T$$ (Formula 19)

$$X2 = \begin{bmatrix} X_{4,3} & X_{5,2} & X_{6,1} & X_{7,0} & X_{1,7} & X_{2,6} & X_{3,5} & X_{4,4} \\ X_{5,3} & X_{6,2} & X_{7,1} & X_{2,7} & X_{3,6} & X_{4,5} & X_{5,4} & X_{6,3} \\ X_{7,2} & X_{3,7} & X_{4,6} & X_{5,5} & X_{6,4} & X_{7,3} & X_{4,7} & X_{5,6} \\ X_{6,5} & X_{7,4} & X_{5,7} & X_{6,6} & X_{7,5} & X_{6,7} & X_{7,6} & X_{7,7} \end{bmatrix}^T$$

The non-separable secondary transform and the inverse secondary transform are represented by Formula 5 and Formula 11.

Hereinafter, the shape of an input region of the secondary transform extracted by the sorting unit 702 of the transform and quantization unit 103 (input SX of the secondary transform) is described, and the shape is also used as the shape of an output region of the inverse secondary transform in the sorting unit 709 of the inverse quantization and inverse transformer unit 311 (105). That is, depending on the scanning direction, the intra prediction direction, and the block shape, a region configuring the output of the inverse secondary transform may be selected.

Scanning Direction Dependent Secondary Transform

Figure 15:
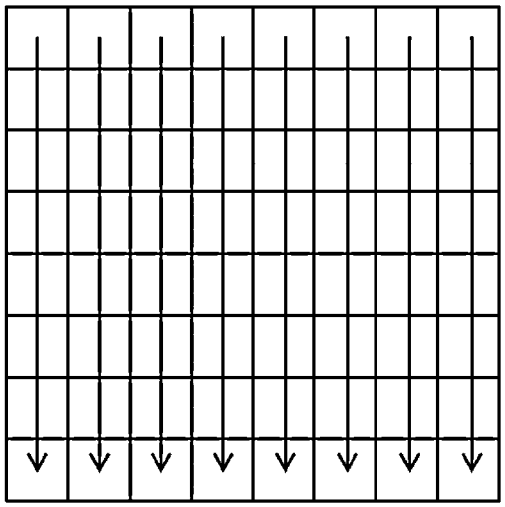
FIG. 15 is a diagram illustrating scanning directions of transform coefficients.
Figure 15:
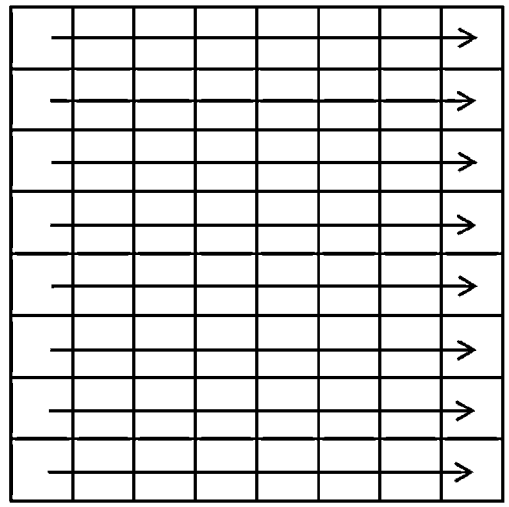
Figure 15:
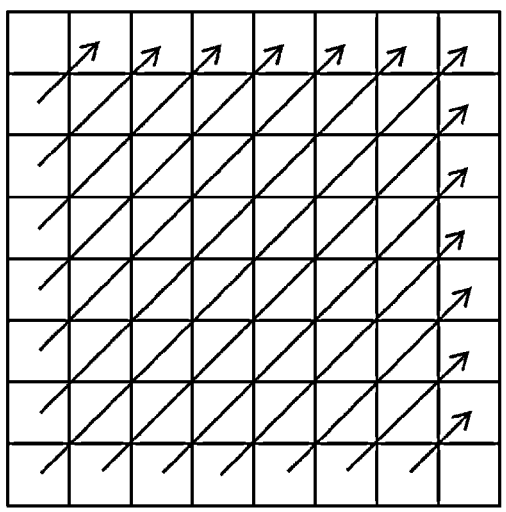

For M*M secondary transform (FIG. 14 is an example of M=8), the use of any input SX of FIGS. 14(a) to 14(c) is determined by using three types of scanning directions of transform coefficients illustrated in FIG. 15. FIG. 14 is a common array, wherein X, Xm,n are read in substitution with SX, SXm,n. A secondary transform region that is vertically long, for example, the input SX in FIG. 14(a), may be used in a case that the scanning direction of the transform coefficients is the vertical direction, a secondary transform region that is horizontally long, for example, the input SX in FIG. 14(b) may be used in a case that the scanning direction is the horizontal direction, and otherwise (the scanning direction is the diagonal direction), a secondary transform region hat is vertically long or horizontally long may be used as the input SX.

As another configuration, secondary transform region that is vertically long, for example, the input SX in FIG. 14(a), is used in a case that the scanning direction of the transform coefficients is the vertical direction, and a secondary transform region that is horizontally long, for example, the input SX in FIG. 14(b) is used in a case that the scanning direction is the horizontal direction. Otherwise (the scanning direction is the diagonal direction), secondary transform is performed by using a secondary transform region, for example, the input SX in FIG. 14(c), of the upper left center region having a distance equal to or less than a certain distance from the top left of the M*M block. Note that in a case that the input is FIG. 14(c) and the number of elements is a power of two, a region (triangle) is not formed where the distance from the upper left is completely an equidistant distance, and is a shape distorted to some extent, but is not particularly problematic.

In addition, as another configuration, in a case of separable secondary transform, secondary transform region that is vertically long, for example, the input SX in FIG. 14(a), is used in a case that the scanning direction of the transform coefficients is the vertical direction, and a secondary transform region that is horizontally long, for example, the input SX in FIG. 14(b) is used in a case that the scanning direction is the horizontal direction. In a case that the scanning direction is the diagonal direction, reference is made to the intra prediction modes illustrated in FIG. 17, in a case that the intra prediction mode is 0 to predDiag−1, a secondary transform region that is vertically long, for example, the input SX in FIG. 14(a) is used, and in a case that the intra prediction mode is predDiag to predUR, a secondary transform region that is horizontally long, for example, the input SX in FIG. 14(b) is used to perform the secondary transform.

Note that, as illustrated in the flowchart described below, in a case that either one of the width W and the height H of the CU or TU is less than the threshold TH, a square region of 4*4, for example, is used as the input of the secondary transform region, and in other cases (both the width W and the height H of the CU or TU are equal to or greater than the threshold TH), the non-square region described above may be used as the input of the secondary transform region.

Intra Direction Dependent Secondary Transform

As another example, for M*M secondary transform (FIG. 14 is an example of M=8), the use of any of the inputs SX of FIGS. 14(a) to 14(c) may be determined using the intra prediction mode rather than the scanning direction of the transform coefficients. In a case of non-separable secondary transform, in a case that the intra prediction mode is near the horizontal direction, for example, predHor−diff to predHor+diff illustrated in FIG. 17, a secondary transform region that is vertically long, for example, the 4×8 block input SX in FIG. 14(a) is used, and in a case that the intra prediction mode is near the vertical direction, for example, predVer−diff to predVer+diff, a secondary transform region that is horizontally long, for example, the 8×4 block input SX in FIG. 14(b) is used. In other cases, a secondary transform region that is vertically long or horizontally long may be used.

As another configuration, in a case that the intra prediction mode is near the horizontal direction, for example, a secondary transform region that is vertically long in FIG. 14(a) may be used, in a case that the intra prediction mode is near the vertical direction, for example, a secondary transform region that is horizontally long in FIG. 14(b) may be used, and in other cases, a secondary transform region in the upper left center of the M*M blocks, for example, the input SX in FIG. 14(c) may be used to perform the secondary transform.

Figure 17:
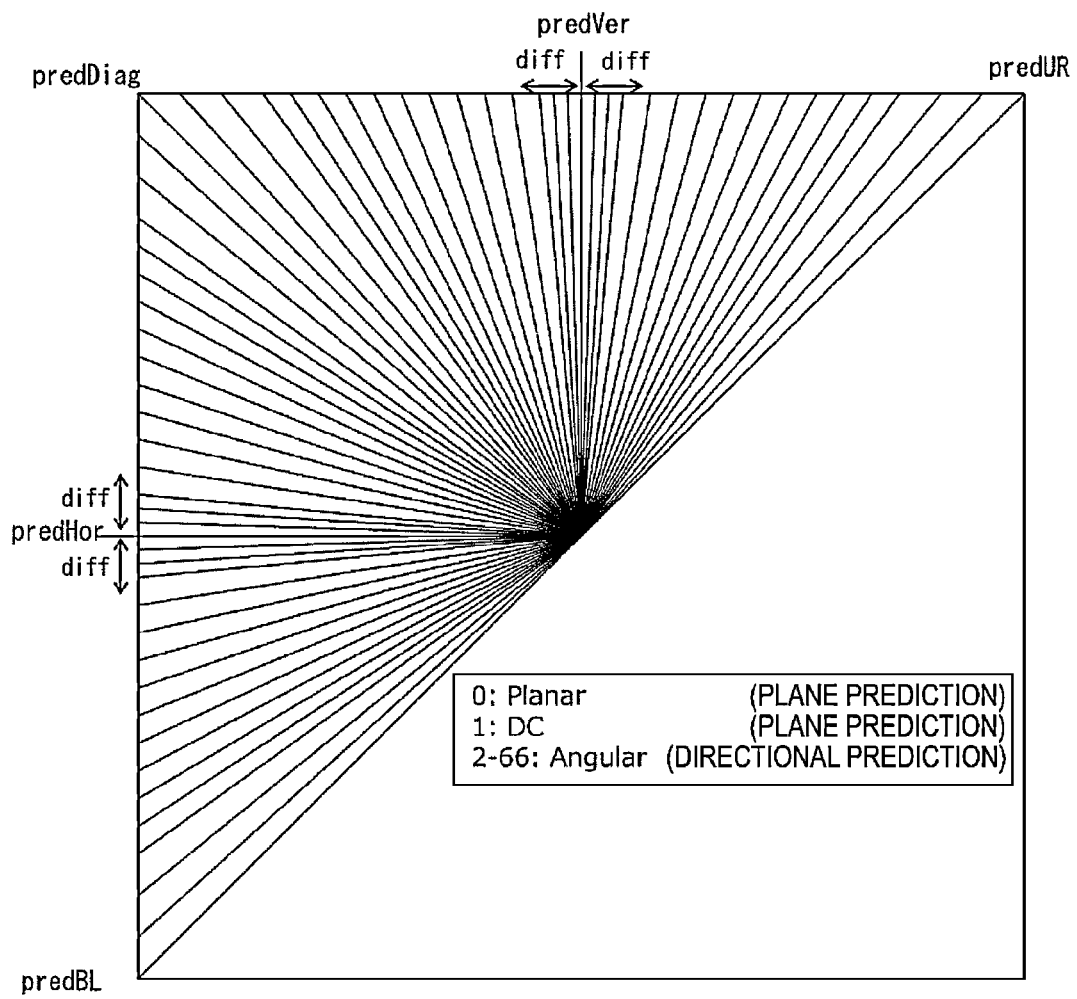
FIG. 17 is a diagram illustrating intra prediction modes.

Furthermore, as another configuration, in a case that the intra prediction mode is less than predDiag illustrated in FIG. 17, the input SX of FIG. 14(a), which is a secondary transform region that is vertically long, may be used, and in a case that the intra prediction mode is greater than predDiag, the input SX of FIG. 14(b), which is a secondary transform region that is horizontally long, may be used to perform the secondary transform. In addition, in a case of an intra prediction mode other than directional predictions, a secondary transform region that is vertically long or horizontally long may be used for the input SX. Here, each of predHor, predVer, predDiag, and predUR is an intra prediction mode number of a horizontal direction prediction, a vertical direction prediction, an top left direction prediction, and from bottom left direction to a top right direction, and in a case that the number of intra prediction modes is 67, predHor=18, pred=50, predDiag=34, predBL=2, predUR=66, and the like are used. diff is a positive integer.

Note that, in a case that either one of the width W and the height H of the CU or TU is less than the threshold TH, a square region of 4*4, for example, is used as the input of the secondary transform region, and in other cases (both the width W and the height H of the CU or TU are equal to or greater than the threshold TH), the non-square region described above may be used as the input of the secondary transform region.

Block Shape Dependent Secondary Transform

As another example, the shape of the region that serves as the input of the secondary transform may be determined using a block shape. In a case that the block shape is vertically long (W<H), for example, a secondary transform region that is vertically long illustrated in FIG. 14(*a*) may be used for the input SX, and in a case that the block shape is horizontally long (W>H), for example, a secondary transform region that is horizontally long illustrated in FIG. 14(*b*) may be used for the input SX. In other cases, a secondary transform region that is vertically long or horizontally long may be used.

As another configuration, in a case that the block shape is vertically long (W<H), for example, a secondary transform region that is vertically long illustrated in FIG. 14(*a*) may be used for the input SX, and in a case that the block shape is horizontally long (W>H), for example, a secondary transform region that is horizontally long illustrated in FIG. 14(*b*) may be used for the input SX. In other cases, a secondary transform region in the upper left center of the M*M blocks illustrated in FIG. 14(*c*) may be used for the input SX.

Note that, in a case that either one of the width W and the height H of the CU or TU is less than the threshold TH, a square region of 4*4, for example, is used as the input of the secondary transform region, and in other cases (both the width W and the height H of the CU or TU are equal to or greater than the threshold TH), the non-square region described above may be used as the input of the secondary transform region.

FIG. 16(*a*) illustrates a flowchart illustrating operations of the transform and quantization unit 103 in FIG. 5 in a case of applying M*N point non-separable secondary transform (M !=N, M and N are not equal).

Figure 11:
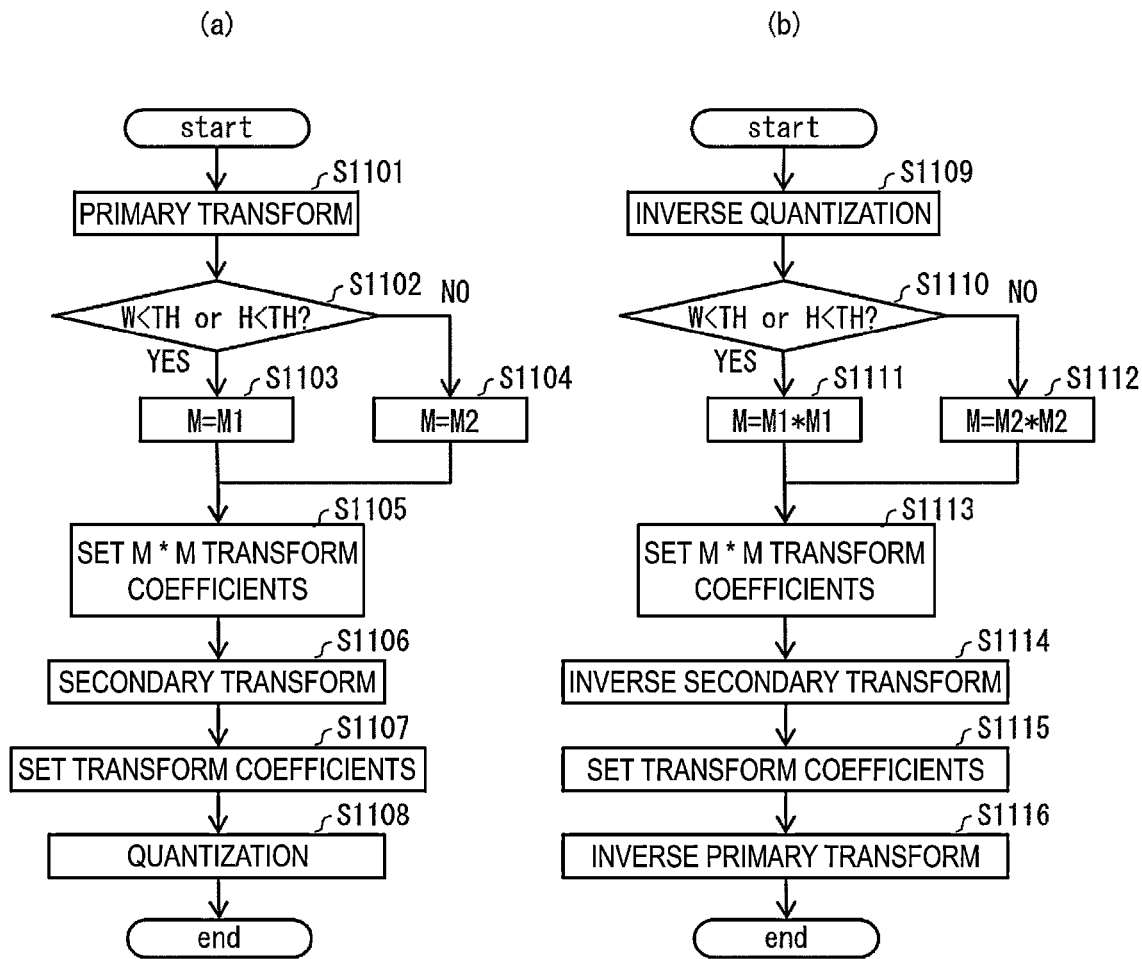
FIG. 11 is a flowchart illustrating operations of the transform and quantization unit and the inverse quantization and inverse transformer unit.

S1101, S1102, and S1108 are the same as S1101, S1102, and S1108 of FIG. 11 and descriptions thereof will be omitted. S1603 and S1605 are cases that the secondary transform of M=N=M1 is applied, and are the same as S1103 and S1105 in FIG. 11, and descriptions thereof will be omitted. In a case that both the width W and the height H of the CU are equal to or greater than the threshold TH, the sorting unit 702 references the scanning direction of the transform coefficients (S1604). In a case that the scanning direction is the vertical direction, the process proceeds to S16041, where the size of the secondary transform is set as M=M2/2 and N=M2 that is vertically long, and as illustrated in Formula 14, M*N transform coefficients in FIG. 14(*a*) are set as the input SX to the secondary transformer unit 703. In a case that the scanning direction is the horizontal direction, the process proceeds to S16042, where the secondary transform size is set as M=M2 and N=M2/2 that is horizontally long, and as illustrated in Formula 16, M*N transform coefficients in FIG. 14(*b*) are set as the input SX to the secondary transformer unit 703. In a case that the scanning direction is other cases (for example, diagonal direction), the process proceeds to S16043, where, as illustrated in Formula 17, M2*M2/2 transform coefficients in FIG. 14(*c*), which is a region on the upper left center of the M*M blocks, as the input SX to the secondary transformer unit 703. Here M1 is less than M2 (M1<M2). It is desirable that the M1 and M2 are a power of two. The secondary transformer unit 703 applies non-separable transform illustrated in Formula 5 to the input primary transform coefficients, and performs the secondary transform (S1606). As illustrated in Formula 6 above, the sorting unit 704 sets the primary transform coefficients and the secondary transform coefficients as the input PY to the quantization unit 705 (S1607). In Formula 14, Formula 16, and Formula 17, M1 is 4 (M1=4) and M2 is 8 (M2=8). Note that FIG. 14, Formula 14, Formula 16, and Formula 17 are common arrays, where X, Xm,n are read in substitution with SX, SXm,n or PY, PYm,n.

FIG. 16(*b*) is a flowchart illustrating operations of the inverse quantization and inverse transformer unit 311 in FIG. 6 and the inverse quantization and inverse transformer unit 105 in FIG. 5 in a case of applying M*N point non-separable secondary transform (M !=N).

S1109, S1110, and S1116 are the same as S1109, S1110, and S1116 of FIG. 11 and descriptions thereof will be omitted. S1611 and S1613 are cases that the inverse secondary transform of M=N=M1 is applied, and are the same as S1111 and S1113 in FIG. 11, and descriptions thereof will be omitted. In a case that both the width W and the height H of the CU are equal to or greater than the threshold TH, the sorting unit 707 references the scanning direction of the transform coefficients (S1612). In a case that the scanning direction is the vertical direction, the process proceeds to S16121, where the size of the inverse secondary transform is set as M=M2/2 and N=M2, and as illustrated in Formula 14, M*N transform coefficients in FIG. 14(*a*) are set as the input SY' to the inverse secondary transformer unit 708. Formula 14 and Formula 16 and Formula 17 referred to below are common arrays, so X is read in substitution with SY'. In other words, X1, X2, and Xm,n are replaced with SY'1, SY'2, and SY'm,n. In a case that the scanning direction is the horizontal direction, the process proceeds to S16122, where the size of the inverse secondary transform is set as M=M2 and N=M2/2, and as illustrated in Formula 16, M*N transform coefficients in FIG. 14(*b*) are set as the input SY' to the inverse secondary transformer unit 708. In a case that the scanning direction is the diagonal direction, the process proceeds to S16123, where, as illustrated in Formula 17, M2*M2/2 transform coefficients in FIG. 14(*c*) are set as the input SY' to the inverse secondary transformer unit 708. The inverse secondary transformer unit 708 applies non-separable transform illustrated in Formula 11 to the input transform coefficients, and performs the inverse secondary transform (S1614). As illustrated in Formula 12 above, the sorting unit 709 sets the primary transform coefficient as the input PX' to the inverse primary transformer unit 710 (S1615). The inverse primary transformer unit 710 performs the inverse primary transform on the transform coefficients (S1616).

Note that in FIG. 16, transform coefficients input to the secondary transformer unit 703 or the inverse secondary transformer unit 708 are set with reference to the scanning direction, but the transform coefficients may be set with reference to the intra prediction mode rather than the scanning direction as described above.

Figure 16A:
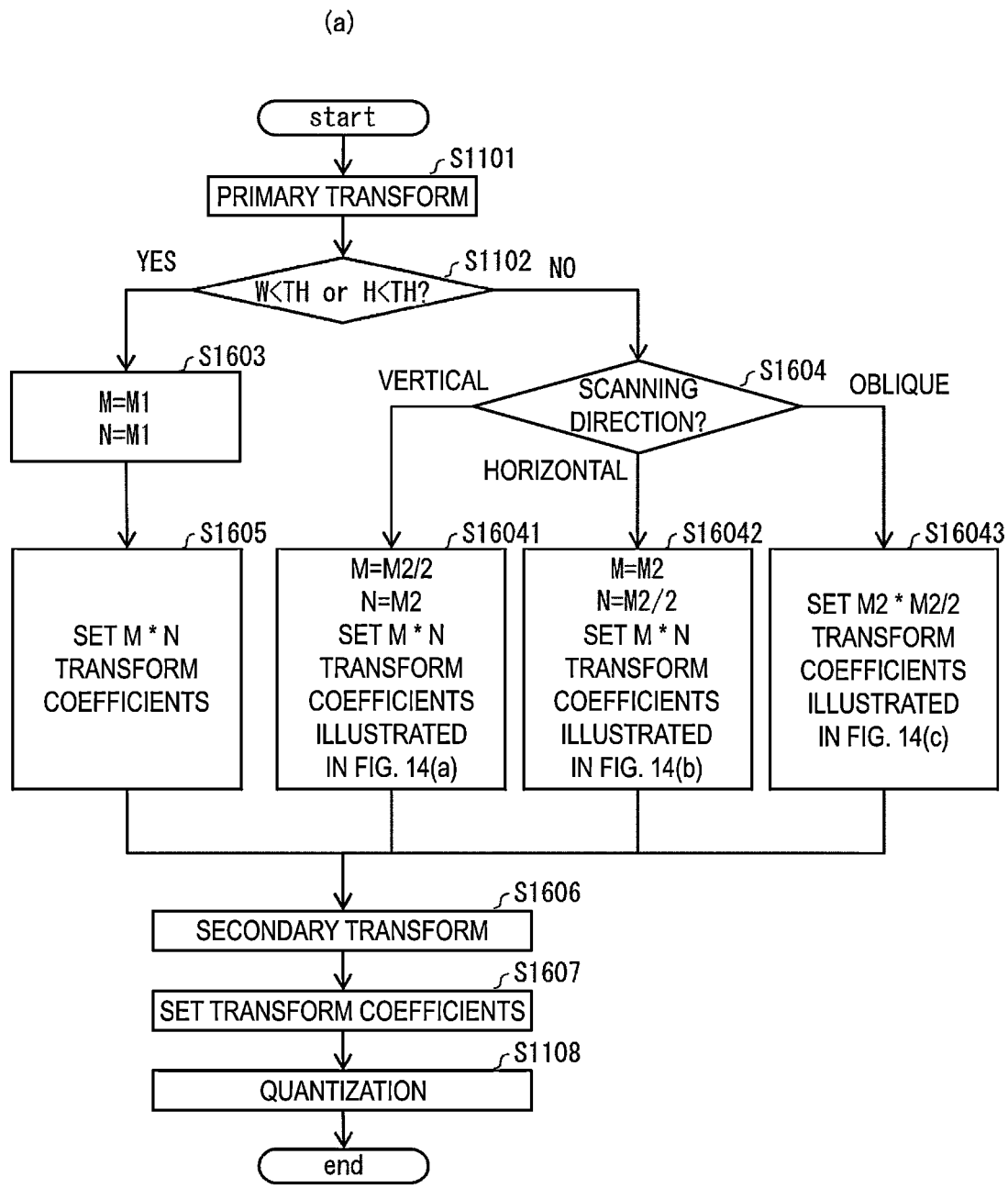
FIG. 16A is another flowchart illustrating operations of the transform and quantization unit and the inverse quantization and inverse transformer unit.
Figure 16B:
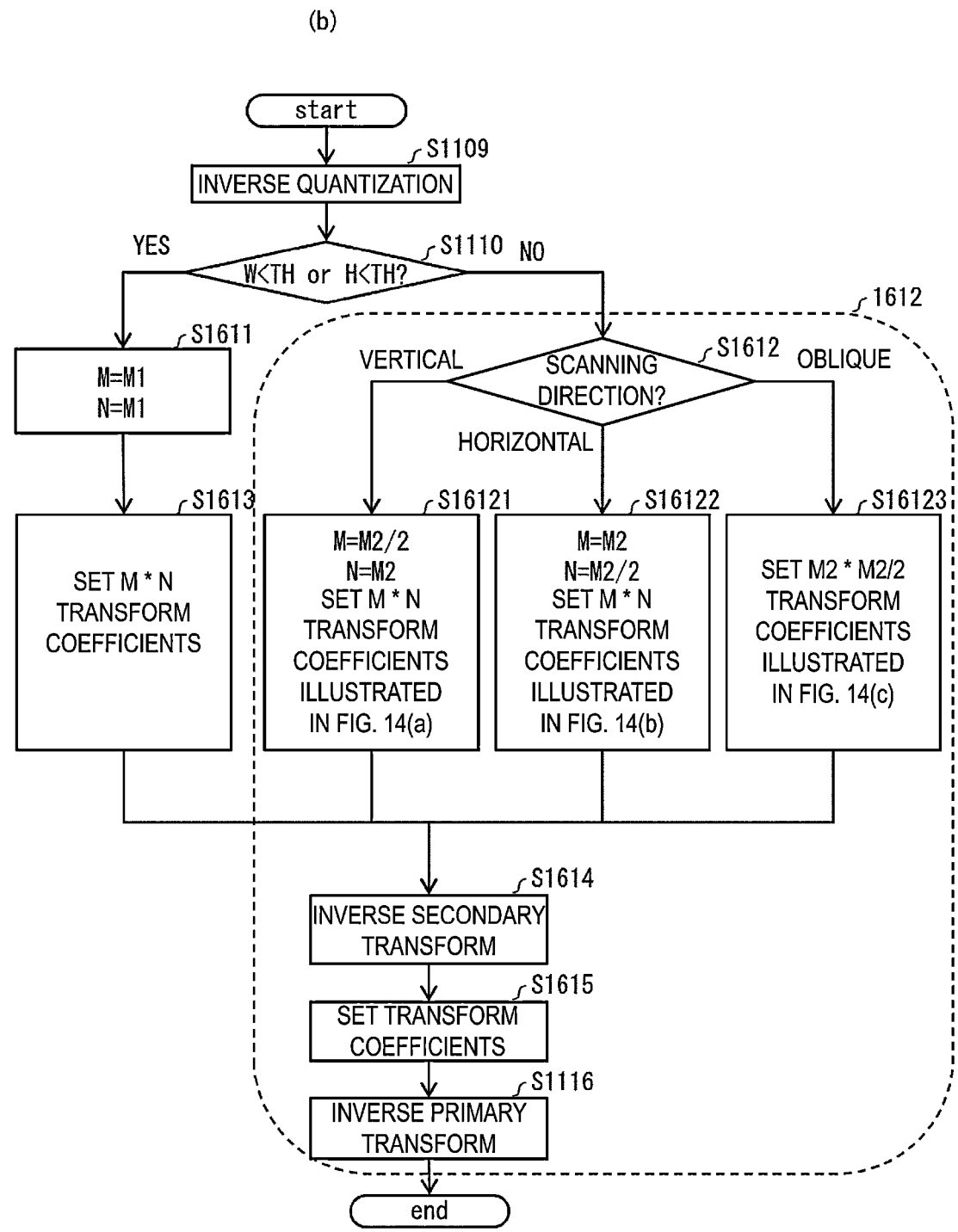
FIG. 16B is another flowchart illustrating operations of the transform and quantization unit and the inverse quantization and inverse transformer unit.

Although FIG. 16 illustrates operations of performing secondary transform or inverse secondary transform on transform coefficients SX1 or SY'1 present on the low frequency component side, by processing S1102 to S1607 twice in FIG. 16(a), S1110 to S1615 twice in FIG. 16(b), and setting transform coefficients SX2 or SY'2 present on the high frequency component side in the second time as input of secondary transform or inverse secondary transform, secondary transform or inverse secondary transform may be performed on the entire M*M.

As described above, by using non-square M*N (M !=N) as a region of transform coefficients subjected to secondary transform, the amount of processing and the memory used can be reduced while suppressing reduction in the coding efficiency. Furthermore, by combining horizontally long transform M*N and vertically long transform N*M where M is greater than N (M>N), reduction in the coding efficiency is minimized even for a transform size smaller than M*M transform.

Embodiment 2

In Embodiment 1, a technique has been described in which the amount of processing and the memory used are reduced while suppressing reduction in the coding efficiency, by setting the number of elements of secondary transform from M2*M2 to M2*M2/2. In Embodiment 2, a technique will be described in which the amount of processing and the memory used are reduced while suppressing reduction in the coding efficiency, by applying small size secondary transform such as M1*M1 without using M2*M2 secondary transform even in a case that the CU size is large. Here, the definitions of M1 and M2 are the same as in Embodiment 1.

Figure 18:
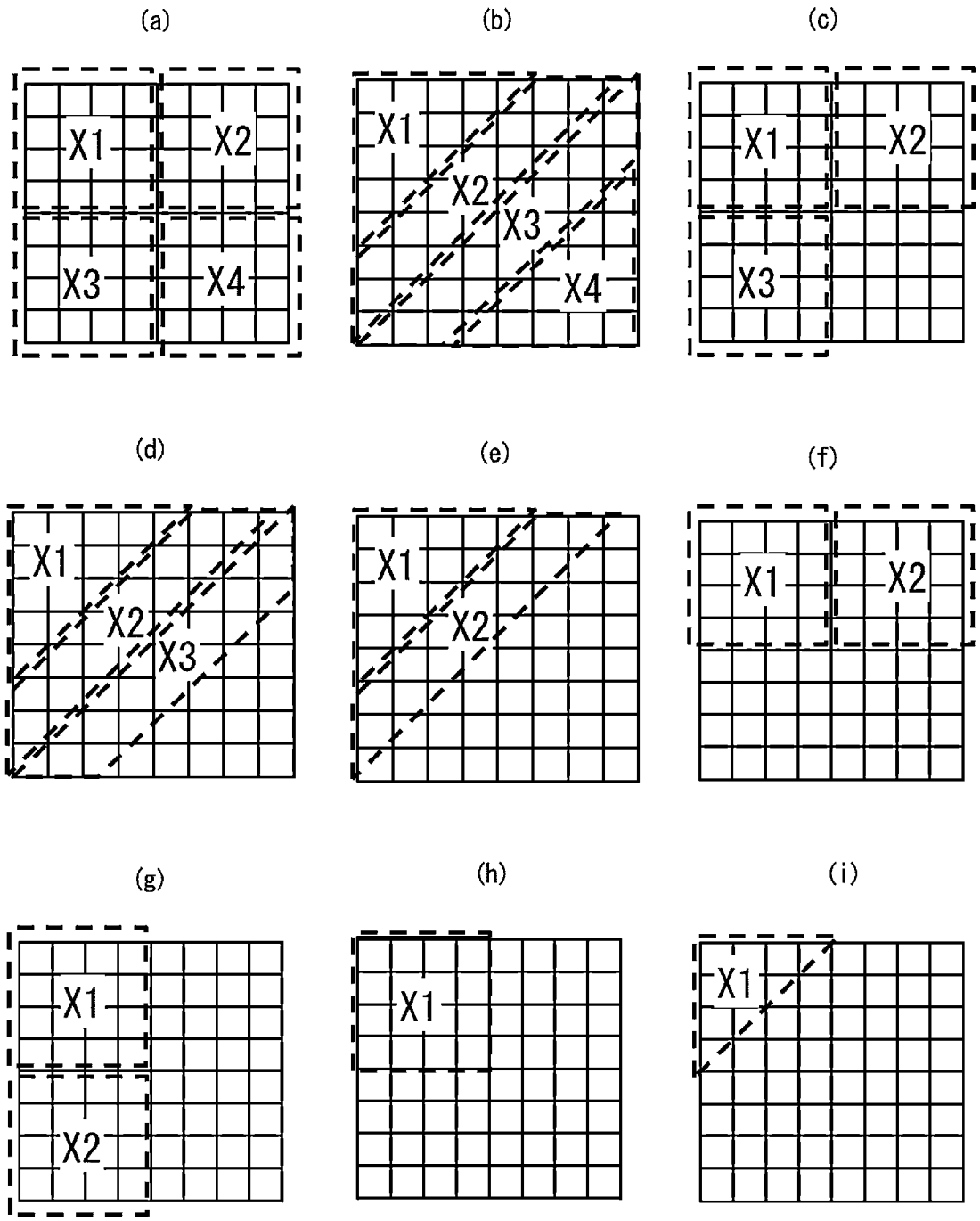
FIG. 18 is a diagram illustrating 16 coefficients for inputting to secondary transform.

FIG. 18 is an example in which an M2*M2 size block subjected to secondary transform is divided into small size regions (an M1*M1 rectangular block, or M1*M1 one-dimensional data, both referred to as block hereinafter) and M2 is configured as 8 and M1 is configured as 4 in a case of performing secondary transform for each small block. An example of M2=8 and M1=4 is described below, but other values can be taken, not limited to M2=8 and M1=4, in a case that M2 and M1 are a power of two and the relationship that M2 is greater than M1 (M2>M1) is satisfied. FIGS. 18(a) and 18(b) illustrate cases that secondary transform is performed on all of the divided small blocks, FIGS. 18(c) and 18(d) illustrate cases that secondary transform is performed on three of the divided small blocks, FIGS. 18(e), 18(f) and 18(g) illustrate cases that secondary transform is performed on two of the divided small blocks, and FIGS. 18(h) and 18(i) illustrate cases that secondary transform is performed on one of the divided small blocks. Here, the inputs SX1, SX2, SX3, and SX4 to the separable secondary transformer unit 703 is illustrated below in a case that a small block is defined as a two-dimensional array as illustrated in FIG. 18(a), and in a case that a small block is defined as a one-dimensional array as illustrated in FIG. 18(b).

Equation 9

$$X1 = \begin{bmatrix} X_{0,0} & X_{1,0} & X_{2,0} & X_{3,0} \\ X_{0,1} & X_{1,1} & X_{2,1} & X_{3,1} \\ X_{0,2} & X_{1,2} & X_{2,2} & X_{3,2} \\ X_{0,3} & X_{1,3} & X_{2,3} & X_{3,3} \end{bmatrix} \quad X2 = \begin{bmatrix} X_{4,0} & X_{5,0} & X_{6,0} & X_{7,0} \\ X_{4,1} & X_{5,1} & X_{6,1} & X_{7,1} \\ X_{4,2} & X_{5,2} & X_{6,2} & X_{7,2} \\ X_{4,3} & X_{5,3} & X_{6,3} & X_{7,3} \end{bmatrix} \text{ (Formula 20)}$$

$$X3 = \begin{bmatrix} X_{0,4} & X_{1,4} & X_{2,4} & X_{3,4} \\ X_{0,5} & X_{1,5} & X_{2,5} & X_{3,5} \\ X_{0,6} & X_{1,6} & X_{2,6} & X_{3,6} \\ X_{0,7} & X_{1,7} & X_{2,7} & X_{3,7} \end{bmatrix} \quad X4 = \begin{bmatrix} X_{4,4} & X_{5,4} & X_{6,4} & X_{7,4} \\ X_{4,5} & X_{5,5} & X_{6,5} & X_{7,5} \\ X_{4,6} & X_{5,6} & X_{6,6} & X_{7,6} \\ X_{4,7} & X_{5,7} & X_{6,7} & X_{7,7} \end{bmatrix}$$

The inputs SX1, SX2, SX3, and SX4 to the non-separable secondary transformer unit 703 are illustrated below.

Equation 10

$$X1 = [X_{0,0} \ X_{1,0} \ X_{2,0} \ X_{3,0} \ X_{0,1} \ X_{1,1} \ X_{2,1} \ X_{3,1} \ X_{0,2} \ X_{1,2} \ X_{2,2} \ X_{3,2} \ X_{0,3} \ X_{1,3} \ X_{2,3} \ X_{3,3}]^T \text{ (Formula 21)}$$

$$X2 = [X_{4,0} \ X_{5,0} \ X_{6,0} \ X_{7,0} \ X_{4,1} \ X_{5,1} \ X_{6,1} \ X_{7,1} \ X_{4,2} \ X_{5,2} \ X_{6,2} \ X_{7,2} \ X_{4,3} \ X_{5,3} \ X_{6,3} \ X_{7,3}]^T$$

$$X3 = [X_{0,4} \ X_{1,4} \ X_{2,4} \ X_{3,4} \ X_{0,5} \ X_{1,5} \ X_{2,5} \ X_{3,5} \ X_{0,6} \ X_{1,6} \ X_{2,6} \ X_{3,6} \ X_{0,7} \ X_{1,7} \ X_{2,7} \ X_{3,7}]^T$$

$$X4 = [X_{4,4} \ X_{5,4} \ X_{6,4} \ X_{7,4} \ X_{4,5} \ X_{5,5} \ X_{6,5} \ X_{7,5} \ X_{4,6} \ X_{5,6} \ X_{6,6} \ X_{7,6} \ X_{4,7} \ X_{5,7} \ X_{6,7} \ X_{7,7}]^T$$

$$X1 = [X_{0,0} \ X_{0,1} \ X_{1,0} \ X_{0,2} \ X_{1,1} \ X_{2,0} \ X_{0,3} \ X_{1,2} \ X_{2,1} \ X_{3,0} \ X_{0,4} \ X_{1,3} \ X_{2,2} \ X_{3,1} \ X_{4,0} \ X_{0,5}]^T \text{ (Formula 22)}$$

$$X2 = [X_{1,4} \ X_{2,3} \ X_{3,2} \ X_{4,1} \ X_{5,0} \ X_{0,6} \ X_{1,5} \ X_{2,4} \ X_{3,3} \ X_{4,2} \ X_{5,1} \ X_{6,0} \ X_{0,7} \ X_{1,6} \ X_{2,5} \ X_{3,4}]^T$$

$$X3 = [X_{4,3} \ X_{5,2} \ X_{6,1} \ X_{7,0} \ X_{1,7} \ X_{2,6} \ X_{3,5} \ X_{4,4} \ X_{5,3} \ X_{6,2} \ X_{7,1} \ X_{2,7} \ X_{3,6} \ X_{4,5} \ X_{5,4} \ X_{6,3}]^T$$

$$X4 = [X_{7,2} \ X_{3,7} \ X_{4,6} \ X_{5,5} \ X_{6,4} \ X_{7,3} \ X_{4,7} \ X_{5,6} \ X_{6,5} \ X_{7,4} \ X_{5,7} \ X_{6,6} \ X_{7,5} \ X_{6,7} \ X_{7,6} \ X_{7,7}]^T$$

Note that Formula 20 to Formula 22 are common arrays, where X, Xm,n are read in substitution with SX, SXm,n.

How many small blocks of the small blocks into which the M2*M2 block is divided is subjected to secondary transform can be determined in accordance with an acceptable amount of processing and memory size. In a case that the amount of processing and the memory size have room, secondary transform is performed on all small blocks, and in a case that the amount of processing and the memory size have almost no room, secondary transform is only performed on one small block. In this way, the number of small blocks subjected to secondary transform can be determined in accordance with the room of the amount of processing and the memory size. The number of small blocks subjected to secondary transform may be coded and notified to the image decoding device. Alternatively, in a case that the number is determined by reference to level information included in the coded data, it is not necessary to add a new syntax indicating the number.

The scanning direction and intra prediction mode of the transform coefficients are referred to determine whether to divide into rectangular small blocks or divide into non-rectangular small blocks, or which small blocks are subjected to secondary transform. For example, in a case that the scanning direction is the vertical or horizontal direction, the block is divided into rectangular small blocks, and in a case that the scanning direction is the diagonal direction, the block is divided into non-rectangular small blocks. Alternatively, in a case that the intra prediction mode is predHor−diff to predHor+diff or predVer−diff to predVer+diff illustrated in FIG. 17, the block is divided into rectangular small blocks or otherwise divided into non-rectangular small blocks. Alternatively, in a case that secondary transform is performed on two small blocks, in a case that the scanning direction is the vertical direction, SX1 and SX3 are selected as inputs as in FIG. 18(g), in a case of the horizontal direction, SX1 and SX2 are selected as inputs as in FIG. 18(f), and in a case of the diagonal direction, SX1 and SX2 are selected as inputs as in FIG. 18(e). Alternatively, in a case that the intra prediction mode is predHor−diff to predHor+diff illustrated in FIG. 17, SX1 and SX3 are selected as inputs as in FIG. 18(g), in a case of predVer−diff to predVer+diff, SX1 and SX2 are selected as inputs as in FIG. 18(f), and otherwise SX1 and SX2 are selected as inputs as in FIG. 18(e).

The operation of the transform and quantization unit 103 and the inverse quantization and inverse transformer unit 311 (105) in a case that the M*M block subjected to secondary transform are divided into small size blocks and secondary transform or inverse secondary transform is performed for each block is substantially the same as the operation of the flowchart of FIG. 16, but the operation of the sorting unit is slightly different. Therefore, a portion (1612) surrounded by a frame line illustrated in FIG. 16(b) will be described using FIG. 19. With respect to FIG. 16(a), the difference in the processing contents of the sorting unit is the same as in FIG. 16(b), and descriptions thereof will be omitted.

Figure 19A:
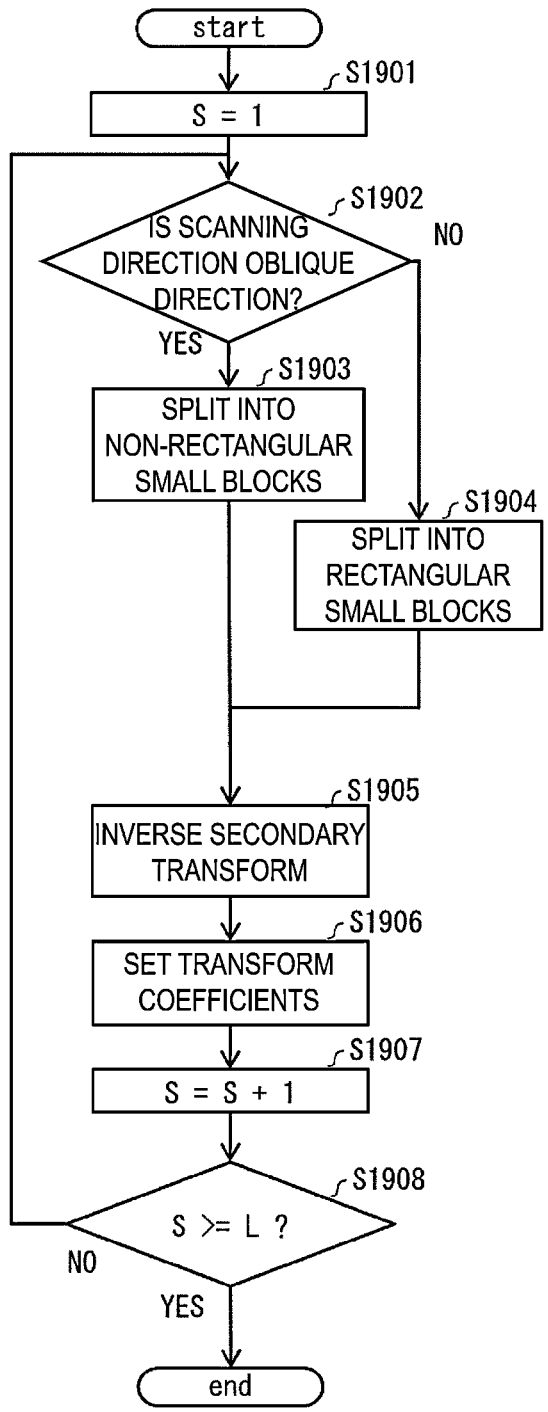
FIG. 19A is a flowchart illustrating a part of operations of the inverse quantization and inverse transformer unit.

Operations of the sorting unit and the inverse secondary transformer unit in a case that the number L of small blocks subjected to secondary transform is 1, 3, 4 are described using the flowchart of FIG. 19(a). The inverse quantization and inverse transformer unit 311 (105) sets the variable s as 1 (S1901). S is a number of an array SX of transform coefficients input to the inverse secondary transformer unit 708. The sorting unit 707 checks whether or not the scanning direction of the transform coefficients is the diagonal direction (S1902), and in a case of the diagonal direction, the process proceeds to S1903, or otherwise the process proceeds to S1904. In a case that the scanning direction of the transform coefficients is the diagonal direction, the sorting unit 707 divides the M*M block subjected to inverse secondary transform into non-rectangular small blocks, and sets SY's of Formula 22 (S1903). Here, s is equal to 1 to L. Note that X, Xm,n in Formula 20 to Formula 22 are read in substitution with SY', SY'm,n as previously described. In a case that the scanning direction of the transform coefficients is not the diagonal direction, the sorting unit 707 divides the M*M block subjected to secondary transform into rectangular small blocks, and sets SY' of Formula 21 (S1904). The inverse secondary transformer unit 708 performs inverse secondary transform on the array SY' set in the sorting unit 707 (S1905). The sorting unit 709 writes the output SX' of inverse secondary transform to the array PX' input to inverse primary transform (S1906). The inverse quantization and inverse transformer unit 311 (105) increments the variable s (S1907). The inverse quantization and inverse transformer unit 311 (105) compares the variable s and the number L of small blocks, and in a case of not S=L, returns to S1902 and continues processing for the next small block, and in a case of S>=L, terminates processing because processing of all small blocks of interest has ended.

Figure 19B:
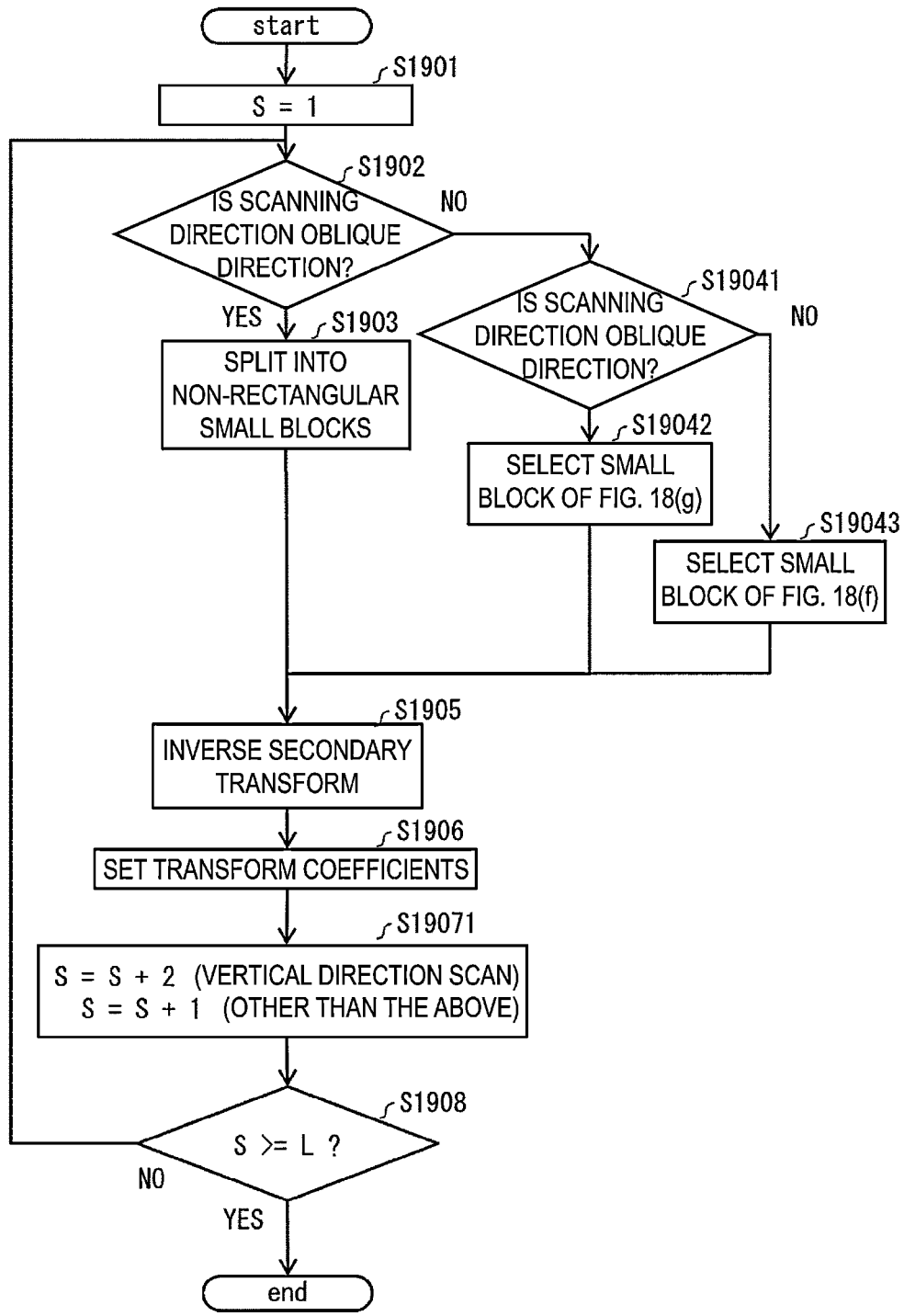
FIG. 19B is a flowchart illustrating a part of operations of the inverse quantization and inverse transformer unit.

Operations of the sorting unit and the inverse secondary transformer unit in a case that the number L of small blocks subjected to secondary transform is 2 are described using the flowchart of FIG. 19(b). The processing of S1901 to S1902, S1905 to S1906, and S1908 are the same as in FIG. 19(a), and descriptions thereof will be omitted. In a case that the scanning direction of the transform coefficients is the diagonal direction, the sorting unit 707 divides the target region of secondary transform into non-rectangular small blocks in FIG. 18(e), selects the corresponding transform coefficient from Formula 22, and sets the SY' (S1903). Note that X, Xm,n in Formula 22 and Formula 21 described below are read in substitution with SY', SY'm,n as previously described. The sorting unit 707 checks whether or not the scanning direction of the transform coefficients is the vertical direction (S19041), and in a case of the vertical direction, the process proceeds to S19042, or otherwise the process proceeds to S19043. In a case of the vertical direction scanning, the sorting unit 707 divides the target region of secondary transform into small blocks in FIG. 18(g), and selects corresponding transform coefficients from Formula 21 and sets SY's (S19042). In a case of the horizontal direction scanning, the sorting unit 707 divides the target region of secondary transform into small blocks in FIG. 18(f), and selects corresponding transform coefficients from Formula 21 and sets SY's (S19043). The inverse quantization and inverse transformer unit 311 (105) increments the variable s by two in a case of the vertical direction scanning, and otherwise increments the variable s by one (S19071).

In Embodiment 2, the amount of processing and the memory used can be reduced while suppressing reduction in the coding efficiency, by applying multiple small size secondary transforms such as M1*M1 without using M2*M2 secondary transform even in a case that the CU size is large.

Modification 1

In Embodiment 1 and Embodiment 2, secondary transform/inverse secondary transform, or input SX/SY' shape (type) to secondary transform/inverse secondary transform is derived from the scanning direction and the intra prediction mode of the transform coefficients. In Modification 1, a technique will be described in which the type of transform is explicitly notified by using the index nIdx used for selecting the secondary transform.

As illustrated in FIG. 12, a transform set consisting of three types of transforms is provided for each intra prediction mode in secondary transform, and the transform specified by nIdx is selected from the three types of transforms. As illustrated in FIG. 20, to the three types of transforms, M*N transform (M !=N) suitable for the diagonal direction, the vertical direction, and the horizontal direction is allocated.

FIG. 20(a) is an example of sets configured by separable secondary transform and non-separable secondary transform. nIdx=0 is secondary transform off, and nIdx=1 is non-separable secondary transform, and a transform suitable for input of FIG. 14(c) or FIG. 18(b). nIdx=2 is M*N separable secondary transform, with M>N, that is, in a horizontally long shape, and is a transform suitable for input of FIG. 14(b) or FIG. 18(f). nIdx=3 is M*N separable secondary transform, with M<N, that is, in a vertically long shape, and is a transform suitable for input of FIG. 14(a) or FIG. 18(g).

FIG. 20(b) is an example of sets configured by non-separable secondary transform. nIdx=0 is secondary transform off, and nIdx=1 is a transform suitable for input of FIG. 14(c) or FIG. 18(b). nIdx=2 is a transform suitable for horizontally long input such as FIG. 14(b) and FIG. 18(f). nIdx=3 is a transform suitable for vertically long input such as FIGS. 14(a) and 18(g).

In the image encoding device, the coding parameter determination unit 110 derives an optimal secondary transform for the target CU from among them, and code nIdx to code and decode an image by using the secondary transform with the highest coding efficiency.

As described above, in Modification 1, the type of secondary transform applied to primary transform coefficients is coded with the index nIdx, and notified to the image decoding device, and thus, an image can be coded and decoded by using the secondary transform with the highest coding efficiency.

Embodiment 3

The incentive of secondary transform introduction is to concentrate the energy by performing secondary transform on components that have not been able to efficiently concentrate the energy in primary transform. In Embodiment 3, since primary transform realized by separable transform is not optimal for the diagonal direction component, a technique in which secondary transform is performed only in a case that the diagonal direction components are important, that is, in a case that the intra prediction mode is the diagonal direction. In a case of an intra prediction other than the diagonal direction, the energy is not concentrated in the diagonal direction components originally, and therefore, the effect of secondary transform is small, and reduction in coding efficiency is small even in a case that secondary transform is not performed. Since secondary transform is not performed, the amount of processing can be reduced while suppressing reduction in the coding efficiency.

FIG. 17 is a diagram illustrating intra prediction modes iPred. Among 67 types of intra prediction modes illustrated in FIG. 17, only in a case that the prediction direction is a prediction mode of the diagonal direction, that is, predBL<=iPred<predHor−diff∥predHor+
diff<iPred<predVer−diff∥predVer+
diff<iPred<=predUR  (Formula 23), secondary transform is performed. Where diff is a positive integer.

Figure 21:
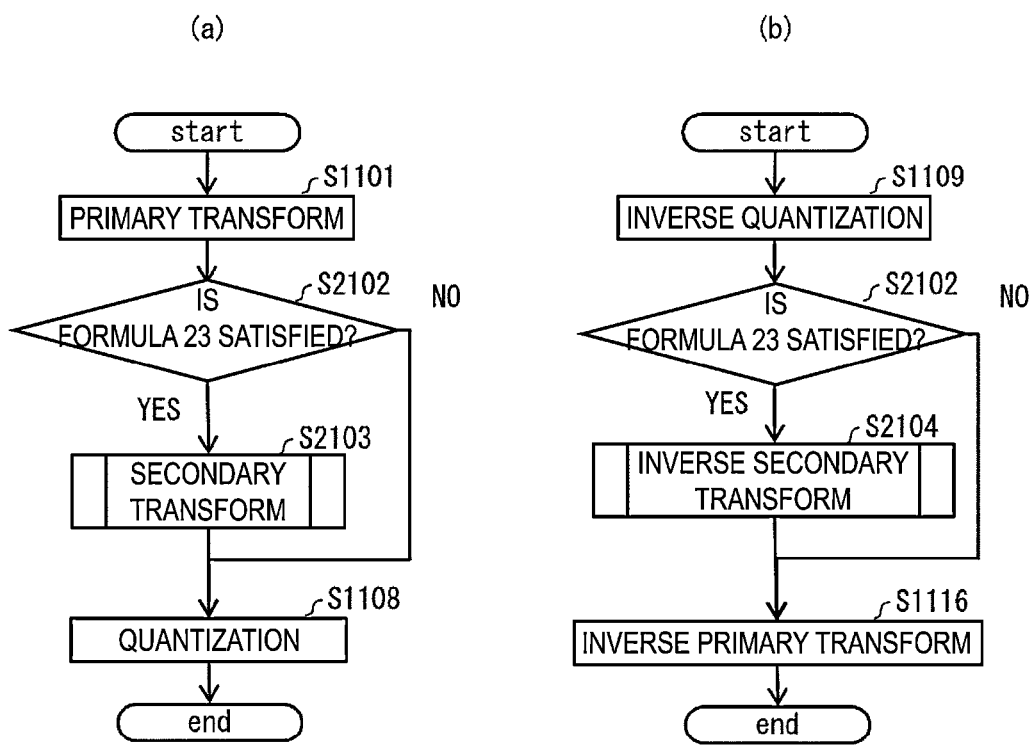
FIG. 21 is another flowchart illustrating operations of the transform and quantization unit and the inverse quantization and inverse transformer unit.

FIG. 21(a) is a flowchart illustrating operations of the transform and quantization unit 103. In FIG. 21(a), S1101 and S1108 are the same as S1101 and S1108 in FIG. 11(a), and thus descriptions thereof will be omitted. The transform and quantization unit 103 checks whether or not the intra prediction mode of the target CU satisfies Formula 23 (S2102). In a case that the intra prediction mode of the target CU satisfies Formula 23, the process proceeds to S2103 to perform secondary transform, and otherwise proceeds to S1108 without performing secondary transform. In S2103, secondary transform processing of the S1102 to S1107 of FIG. 11(a), or S1102 to S1607 of FIG. 16(a) is performed.

FIG. 21(b) is a flowchart illustrating operations of the inverse quantization and inverse transformer unit 311 (105). In FIG. 21(b), S1109 and S1116 are the same as S1109 and S1116 in FIG. 11(b), and thus descriptions thereof will be omitted. The inverse quantization and inverse transformer unit 311 (105) checks whether or not the intra prediction mode of the target CU satisfies Formula 23 (S2102). In a case that the intra prediction mode of the target CU satisfies Formula 23, the process proceeds to S2104 to perform inverse secondary transform, and otherwise proceeds to S1116 without performing inverse secondary transform. In S2104, inverse secondary transform processing of S1110 to S1115 in FIG. 11(b), or S1110 to S1615 in FIG. 16(b) is performed.

As described above, secondary transform is a transform applied to coefficients after the primary transform. In general, the primary transform is realized by separable transform, and is not optimal for diagonal direction components, and the energy is not efficiently concentrated. In such a case, more energy can be concentrated in specific components by performing secondary transform effective for components in the diagonal direction again on the primary transform coefficients.

Modification 2

In Embodiment 3, an example of a technique for changing the option of secondary transform in accordance with the intra prediction mode has been described in which secondary transform is performed in a case that the intra prediction mode is the diagonal direction, and secondary transform is not performed otherwise. In Modification 2, a technique for increasing the option of secondary transform and suppressing reduction in the coding efficiency will be described.

In secondary transform, as illustrated in FIG. 20, a technique for selecting a secondary transform shape (type) explicitly by using an index nIdx is described in Modification 1, but in Modification 2, the value of nIdx is limited in accordance with the intra prediction mode.

In Modification 2, in a case that the intra prediction mode iPred is the horizontal direction (predHor−diff<=iPred<=predHor+diff), then secondary transform is selected from three of the transform suitable for the horizontal direction (nIdx=3), the transform suitable for the diagonal direction (nIdx=1), and transform off (nIdx=0). In a case that the intra prediction mode iPred is the vertical direction (predVer−diff<=iPred<=predVer+diff), then secondary transform is selected from three of the transform suitable for the vertical direction (nIdx=2), the transform suitable for the diagonal direction (nIdx=1), and transform off (nIdx=0). In other cases (planar prediction, DC prediction, diagonal direction prediction), secondary transform is selected from two of the transform suitable for the diagonal direction (nIdx=1) and transform off (nIdx=0). Where diff is a positive integer. FIG. 22 illustrates relationships between intra prediction modes and possible nIdx.

In this way, by reducing the number of nIdx that can be taken in accordance with the intra prediction mode, reduction in the coding efficiency can be suppressed while reducing the amount of processing.

Embodiment 4

Embodiment 1 to 3 describe techniques for reducing the amount of processing of secondary transform, or the memory used. In Embodiment 4, a technique for reducing the amount of processing by switching whether or not primary transform is applied under certain conditions will be described.

Because primary transform often uses separable transform, the energy concentration is not favorable for components in the diagonal direction, and in secondary transform using non-separable transform, the energy concentration is favorable for components in the diagonal direction. On the other hand, as the transform size increases, primary transform using a separable filter for separating the input into the horizontal and vertical direction components to compute increases in the amount of processing and the memory usage, but is not a very large increase. However, in secondary transform using non-separable transform, as the size becomes two times larger, the amount of memory used becomes four times larger, and thus the amount of operation increases. Therefore, in a case that the transform size is small and the main components are in the diagonal direction, the amount of processing can be reduced by performing only secondary transform and not performing primary transform.

For example, the condition that the transform size is small and the main components are in the diagonal direction is the formula below:

(predBL<=iPred<predHor−diff∥predHor+
diff<iPred<predVer−diff∥predVer+
diff<iPred<=predUR) && (W<=M1 &&
H<=M1)  (Formula 24)

In a case that this is true, primary transform is not performed. Where iPred is an intra prediction mode, W and H are the width and height of the CU, M1 is a threshold for determining whether or not the CU size is small, and diff is a positive integer. For example, M1 is equal to 4.

FIG. 23(a) is a flowchart illustrating operations of the transform and quantization unit 103 of Embodiment 4. In FIG. 23(a), S1101 and S1108 are the same as S1101 and S1108 in FIG. 11(a), and thus descriptions thereof will be omitted. The transform and quantization unit 103 checks whether or not the size and the intra prediction mode of the target CU satisfies Formula 24 (S2301). In a case that the size and intra prediction mode of the target CU does not satisfy Formula 24, the process proceeds to S1101 to perform primary transform, and then proceeds to S2103. Otherwise, the process proceeds to S2103 without performing primary transform. In S2103, secondary transform processing of the S1102 to S1107 of FIG. 11(a), or S1102 to S1607 of FIG. 16(a) is performed.

FIG. 23(b) is a flowchart illustrating operations of the inverse quantization and inverse transformer unit 311 (105) of Embodiment 4. In FIG. 23(b), S1109 and S1116 are the same as S1109 and S1116 in FIG. 11(b), and thus descriptions thereof will be omitted. In S2104, inverse secondary transform processing of S1110 to S1115 in FIG. 11(b), or S1110 to S1615 in FIG. 16(b) is performed. The inverse quantization and inverse transformer unit 311 (105) checks whether or not the size and intra prediction mode of the target CU satisfies Formula 24 (S2301). In a case that the size and the intra prediction mode of the target CU do not satisfy Formula 24, the process proceeds to S1116 to perform inverse primary transform, or otherwise terminates without performing inverse primary transform.

Figure 23:
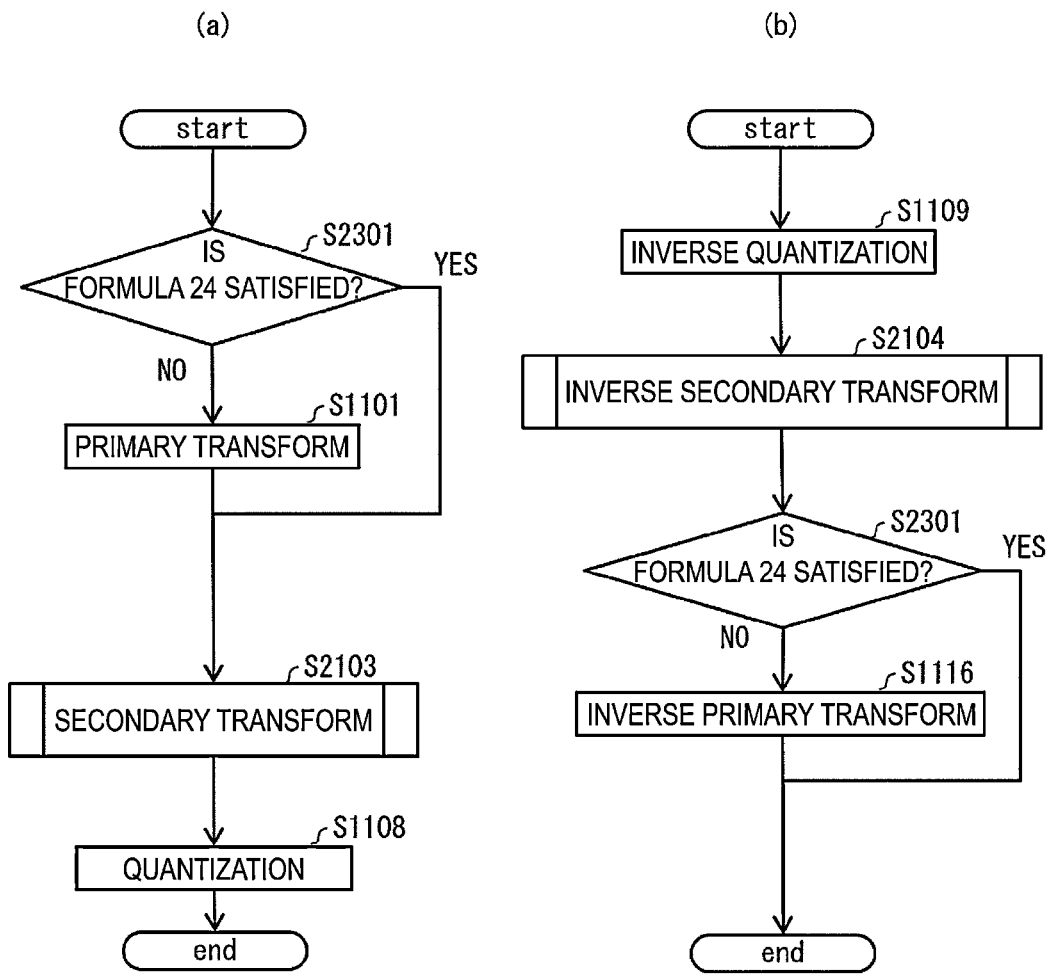
FIG. 23 is another flowchart illustrating operations of the transform and quantization unit and the inverse quantization and inverse transformer unit.

Note that, in FIG. 23, secondary transform and secondary inverse transform use non-separable transform.

As described above, in Embodiment 4, the amount of processing can be reduced while suppressing reduction in the coding efficiency by switching whether or not primary transform is applied under certain conditions.

An image encoding device according to one aspect of the present invention includes: a divider configured to divide a picture of the input video into a coding unit (CU) including multiple pixels; a transformer configured to perform predetermined transform with the CU as a unit and output transform coefficients;
  a quantizer configured to quantize the transform coefficients and output quantization transform coefficients; and an encoder configured to perform variable-length coding on the quantization transform coefficients, wherein the transformer includes a first transformer, and a second transformer configured to perform transform on a part of first transform coefficients output from the first transformer, and the second transformer performs transform on at least any of the first transform coefficients for a region (first region) having different sizes in a horizontal direction and a vertical direction, or the first transform coefficients for a non-rectangular region (second region).

The second transformer of the image encoding device according to one aspect of the present invention further performs transform for a first region in combination with small size square transform.

The second transformer of the image encoding device according to one aspect of the present invention further selects transform for the first region or transform for the second region depending on an intra prediction mode or a scanning direction of transform coefficients.

The image encoding device according to one aspect of the present invention determines whether or not to perform the first transform depending on an intra prediction mode and an CU size.

An image decoding device according to one aspect of the present invention includes: a decoder configured to perform variable-length decoding on coded data with a coding unit (CU) including multiple pixels as a processing unit, and output quantization transform coefficients; an inverse quantizer configured to perform inverse quantization on quantization transform coefficients and output transform coefficients; and an inverse transformer configured to perform inverse transform on the transform coefficients, wherein the inverse transformer includes a second inverse transformer configured to perform inverse transform on at least a part of the transform coefficients and outputting second transform coefficients, and a first inverse transformer configured to perform inverse transform on a remainder of the transform coefficients and the second transform coefficients, and the second inverse transformer performs inverse transform on at least any of the transform coefficients for a region (first region) having different sizes in a horizontal direction and a vertical direction, or the transform coefficients for a non-rectangular region (second region).

The second inverse transformer of the image decoding device according to one aspect of the present invention further performs inverse transform for a first region in combination with small size square inverse transform.

The second inverse transforming unit of the image decoding device according to one aspect of the present invention further selects inverse transform for the first region or inverse transform for the second region depending on an intra prediction mode or a scanning direction of transform coefficients.

The image decoding device according to one aspect of the present invention determines whether or not to perform the first inverse transform depending on an intra prediction mode and an CU size.

Realization Examples by Software

Note that, part of the image encoding device 11 and the image decoding device 31 in the above-mentioned embodiments, for example, the entropy decoding unit 301, the prediction parameter decoding unit 302, the loop filter 305, the prediction image generation unit 308, the inverse quantization and inverse transformer unit 311, the addition unit 312, the prediction image generation unit 101, the subtraction unit 102, the transform and quantization unit 103, the entropy encoder unit 104, the inverse quantization and inverse transformer unit 105, the loop filter 107, the coding parameter determination unit 110, and the prediction parameter encoder unit 111, may be realized by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the image encoding device 11 or the image decoding device 31, and the computer system includes an OS and hardware components such as peripheral devices. Furthermore, the "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Part or all of the image encoding device 11 and the image decoding device 31 in the embodiments described above may be realized as an integrated circuit such as a Large Scale Integration (LSI). Each function block of the image encoding device 11 and the image decoding device 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

Application Examples

The above-mentioned image encoding device 11 and the image decoding device 31 can be utilized being installed to various devices performing transmission, reception, recording, and regeneration of videos. Note that, videos may be natural videos imaged by cameras or the like, or may be artificial videos (including CG and GUI) generated by computers or the like.

At first, referring to FIG. 8, it will be described that the above-mentioned image encoding device 11 and the image decoding device 31 can be utilized for transmission and reception of videos.

Figure 8:
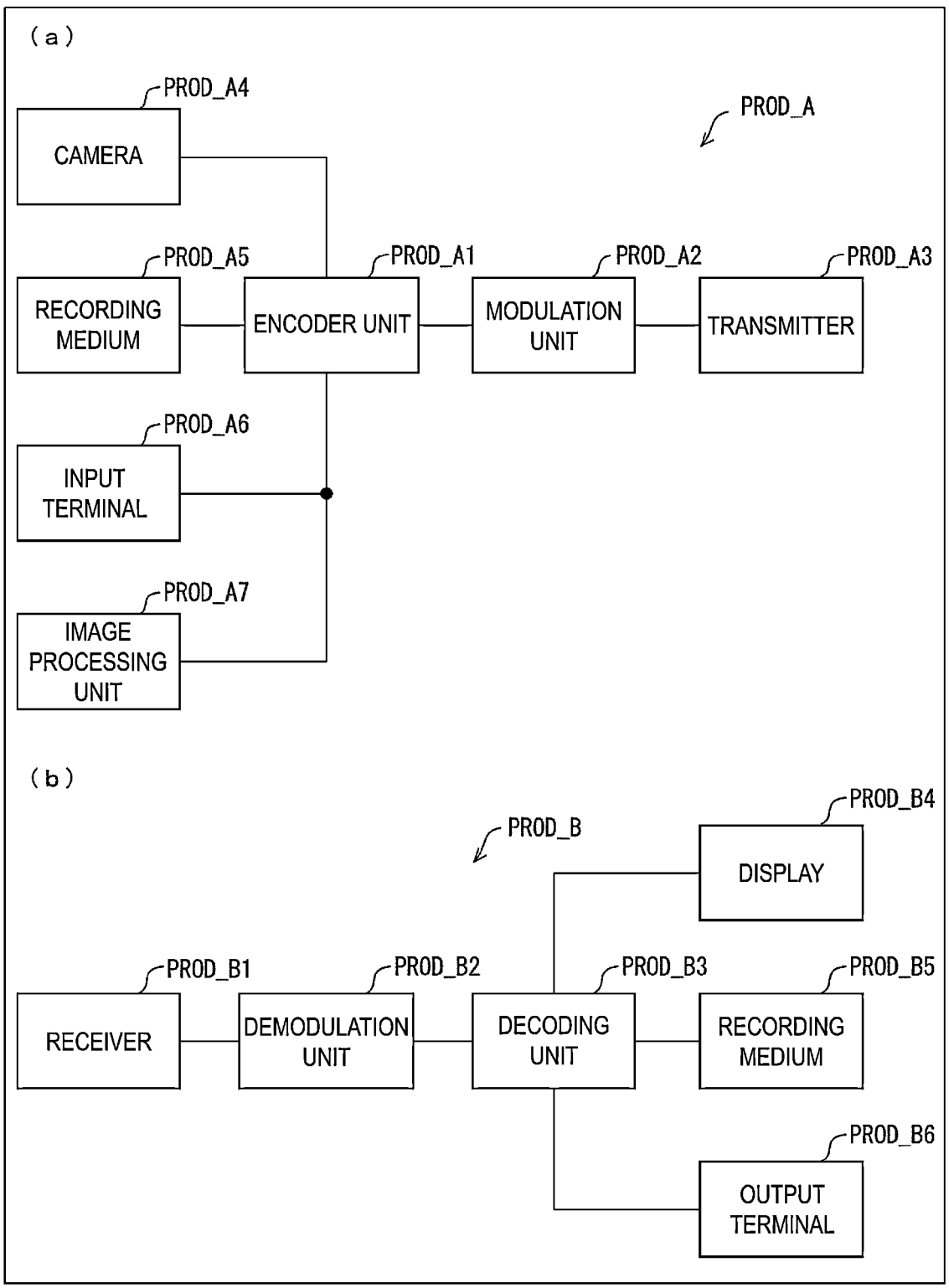
FIG. 8 is a diagram illustrating configurations of a transmission device equipped with the image encoding device and a reception device equipped with the image decoding device according to one embodiment of the present invention. (a) illustrates the transmission device equipped with the image encoding device, and (b) illustrates the reception device equipped with the image decoding device.

(a) of FIG. 8 is a block diagram illustrating a configuration of a transmission device PROD_A installed with the image encoding device 11. As illustrated in (a) of FIG. 8, the transmission device PROD_A includes an encoder unit PROD_A1 which obtains coded data by coding videos, a modulation unit PROD_A2 which obtains modulating signals by modulating carrier waves with the coded data obtained by the encoder unit PROD_A1, and a transmitter PROD_A3 which transmits the modulating signals obtained by the modulation unit PROD_A2. The above-mentioned image encoding device 11 is utilized as the encoder unit PROD_A1.

The transmission device PROD_A may further include a camera PROD_A4 imaging videos, a recording medium PROD_A5 recording videos, an input terminal PROD_A6 to input videos from the outside, and an image processing unit A7 which generates or processes images, as supply sources of videos input into the encoder unit PROD_A1. In (a) of FIG. 8, the configuration that the transmission device PROD_A includes all of these is exemplified, but a part may be omitted.

Note that the recording medium PROD_A5 may record videos which are not coded, or may record videos coded in a coding scheme for recording different than a coding scheme for transmission. In the latter case, a decoding unit (not illustrated) to decode coded data read from the recording medium PROD_A5 according to a coding scheme for recording may be interleaved between the recording medium PROD_A5 and the encoder unit PROD_A1.

(b) of FIG. 8 is a block diagram illustrating a configuration of a reception device PROD_B installed with the image decoding device 31. As illustrated in (b) of FIG. 8, the reception device PROD_B includes a receiver PROD_B1 which receives modulating signals, a demodulation unit PROD_B2 which obtains coded data by demodulating the modulating signals received by the receiver PROD_B1, and a decoding unit PROD_B3 which obtains videos by decoding the coded data obtained by the demodulation unit PROD_B2. The above-mentioned image decoding device 31 is utilized as the decoding unit PROD_B3.

The reception device PROD_B may further include a display PROD_B4 displaying videos, a recording medium PROD_B5 to record videos, and an output terminal PROD_B6 to output videos outside, as supply destinations of videos output by the decoding unit PROD_B3. In (b) of FIG. 8, the configuration that the reception device PROD_B includes all of these is exemplified, but a part may be omitted.

Note that the recording medium PROD_B5 may record videos which are not coded, or may record videos which are coded in a coding scheme for recording different from a coding scheme for transmission. In the latter case, an encoder unit (not illustrated) to code videos acquired from the decoding unit PROD_B3 according to a coding scheme for recording may be interleaved between the decoding unit PROD_B3 and the recording medium PROD_B5.

Note that the transmission medium for transmitting modulating signals may be wireless or may be wired. The transmission aspect to transmit modulating signals may be broadcasting (here, referred to as the transmission aspect where the transmission target is not specified beforehand) or may be telecommunication (here, referred to as the transmission aspect that the transmission target is specified beforehand). Thus, the transmission of the modulating signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting is an example of the transmission device PROD_A/reception device PROD_B for transmitting and/or receiving modulating signals in radio broadcasting. Broadcasting stations (broadcasting equipment, and the like)/receiving stations (television receivers, and the like) of cable television broadcasting are an example of the transmission device PROD_A/reception device PROD_B for transmitting and/or receiving modulating signals in cable broadcasting.

Servers (work stations, and the like)/clients (television receivers, personal computers, smartphones, and the like) for Video On Demand (VOD) services, video hosting services using the Internet and the like are an example of the transmission device PROD_A/reception device PROD_B for transmitting and/or receiving modulating signals in telecommunication (usually, any of radio or cable is used as a transmission medium in the LAN, and cable is used as a transmission medium in the WAN). Here, personal computers include a desktop type PC, a laptop type PC, and a tablet type PC. Smartphones also include a multifunctional portable telephone terminal.

Note that a client of a video hosting service has a function to code videos imaged with a camera and upload them to a server, in addition to a function to decode coded data downloaded from a server and to display it on a display. Thus, a client of a video hosting service functions as both the transmission device PROD_A and the reception device PROD_B.

Next, referring to FIG. 9, it will be described that the above-mentioned image encoding device 11 and the image decoding device 31 can be utilized for recording and regeneration of videos.

Figure 9:
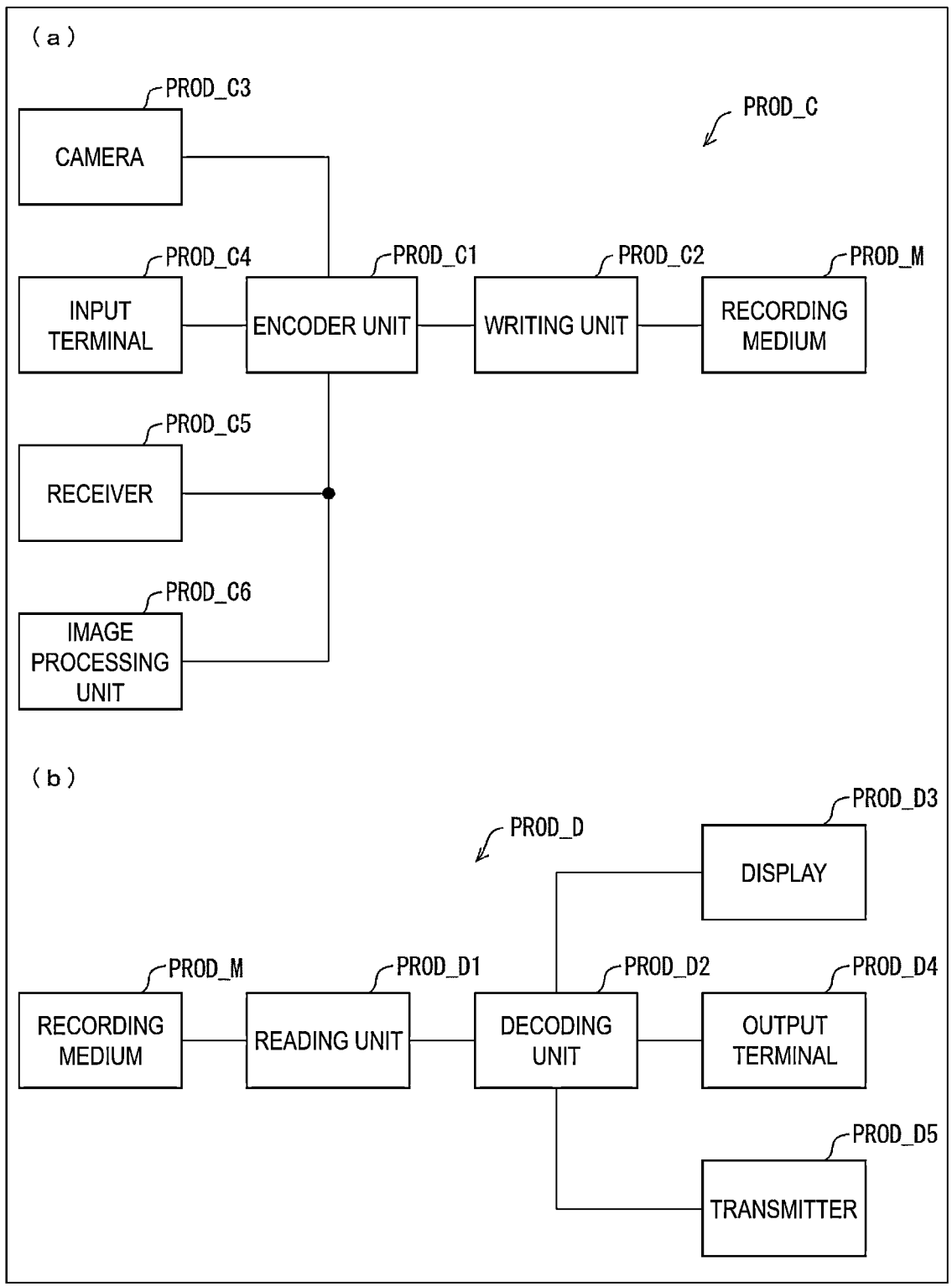
FIG. 9 is a diagram illustrating configurations of a recording device equipped with the image encoding device and a regeneration device equipped with the image decoding device according to one embodiment of the present invention. (a) illustrates the recording device equipped with the image encoding device, and (b) illustrates the regeneration device equipped with the image decoding device.

(a) of FIG. 9 is a block diagram illustrating a configuration of a recording device PROD_C installed with the above-mentioned image encoding device 11. As illustrated in (a) of FIG. 9, the recording device PROD_C includes an encoder unit PROD_C1 which obtains coded data by coding videos, and a writing unit PROD_C2 which writes the coded data obtained by the encoder unit PROD_C1 in a recording medium PROD_M. The above-mentioned image encoding device 11 is utilized as the encoder unit PROD_C I.

Note that the recording medium PROD_M may be (1) a type built in the recording device PROD_C such as Hard Disk Drive (HDD) or Solid State Drive (SSD), may be (2) a type connected to the recording device PROD_C such as an SD memory card or a Universal Serial Bus (USB) flash memory, and may be (3) a type loaded in a drive device (not illustrated) built in the recording device PROD_C such as Digital Versatile Disc (DVD) or Blu-ray Disc (BD (trade name)).

The recording device PROD_C may further include a camera PROD_C3 imaging videos, an input terminal PROD_C4 to input videos from the outside, a receiver PROD_C5 to receive videos, and an image processing unit PROD_C6 which generates or processes images, as supply sources of videos input into the encoder unit PROD_C1. In (a) of FIG. 9, the configuration that the recording device PROD_C includes all of these is exemplified, but a part may be omitted.

Note that the receiver PROD_C5 may receive videos which are not coded, or may receive coded data coded in a coding scheme for transmission different from a coding scheme for recording. In the latter case, a decoding unit (not illustrated) for transmission to decode coded data coded in a coding scheme for transmission may be interleaved between the receiver PROD_C5 and the encoder unit PROD_C1.

Examples of such recording device PROD_C include a DVD recorder, a BD recorder, a Hard Disk Drive (HDD) recorder, and the like (in this case, the input terminal PROD_C4 or the receiver PROD_C5 is the main supply source of videos). A camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of such recording device PROD_C.

(b) of FIG. 9 is a block illustrating a configuration of a regeneration device PROD_D installed with the above-mentioned image decoding device 31. As illustrated in (b) of FIG. 9, the regeneration device PROD_D includes a reading unit PROD_D1 which reads coded data written in the recording medium PROD_M, and a decoding unit PROD_D2 which obtains videos by decoding the coded data read by the reading unit PROD_D1. The above-mentioned image decoding device 31 is utilized as the decoding unit PROD_D2.

Note that the recording medium PROD_M may be (1) a type built in the regeneration device PROD_D such as HDD or SSD, may be (2) a type connected to the regeneration device PROD_D such as an SD memory card or a USB flash memory, and may be (3) a type loaded in a drive device (not illustrated) built in the regeneration device PROD_D such as DVD or BD.

The regeneration device PROD_D may further include a display PROD_D3 displaying videos, an output terminal PROD_D4 to output videos to the outside, and a transmitter PROD_D5 which transmits videos, as supply destinations of videos output by the decoding unit PROD_D2. In (b) of FIG. 9, the configuration that the regeneration device PROD_D includes all of these is exemplified, but a part may be omitted.

Note that the transmitter PROD_D5 may transmit videos which are not coded, or may transmit coded data coded in a coding scheme for transmission different than a coding scheme for recording. In the latter case, an encoder unit (not illustrated) to code videos in a coding scheme for transmission may be interleaved between the decoding unit PROD_D2 and the transmitter PROD_D5.

Examples of such regeneration device PROD_D include a DVD player, a BD player, an HDD player, and the like (in this case, the output terminal PROD_D4 to which a television receiver, and the like is connected is the main supply destination of videos). A television receiver (in this case, the display PROD_D3 is the main supply destination of videos), a digital signage (also referred to as an electronic signboard or an electronic bulletin board, and the like, the display PROD_D3 or the transmitter PROD_D5 is the main supply destination of videos), a desktop type PC (in this case, the output terminal PROD_D4 or the transmitter PROD_D5 is the main supply destination of videos), a laptop type or tablet type PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of such regeneration device PROD_D.

Realization as Hardware and Realization as Software

Each block of the above-mentioned image decoding device 31 and the image encoding device 11 may be realized as hardware by a logical circuit formed on an integrated circuit (IC chip), or may be realized as software using a Central Processing Unit (CPU).

In the latter case, each device includes a CPU performing a command of a program to implement each function, a Read Only Memory (ROM) stored in the program, a Random Access Memory (RAM) developing the program, and a storage device (recording medium) such as a memory storing the program and various data, and the like. The purpose of the embodiments of the present invention can be achieved by supplying, to each of the above described devices, a recording medium recording readably program codes (execution format program, intermediate code program, source program) of a control program of each of the above described devices which is software implementing the above-mentioned functions with a computer, and by the computer reading and performing the program codes (or a CPU or an MPU) recorded in the recording medium.

For example, as the recording medium, a tape such as a magnetic tape or a cassette tape, a disc including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), a card such as an IC card (including a memory card)/an optical card, a semiconductor memory such as a mask ROM/Erasable Programmable Read-Only Memory (EPROM)/Electrically Erasable and Programmable Read-Only Memory (EEPROM (trade name))/a flash ROM, or a Logical circuits such as a Programmable logic device (PLD) or a Field Programmable Gate Array (FPGA) can be used.

Each of the above described devices is configured connectably with a communication network, and the program code may be supplied through the communication network. This communication network may be able to transmit program codes, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or a type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, BlueTooth (trade name), IEEE 802.11 radio communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present invention can be also realized in the form of computer data signals embedded in a carrier wave where the program code is embodied by electronic transmission.

The embodiments of the present invention are not limited to the above-mentioned embodiments, and various modifications are possible within the scope of the claims. Thus, embodiments obtained by combining technical elements modified appropriately within the scope defined by claims are included in the technical scope of the present invention.

CROSS-REFERENCE OF RELATED APPLICATION

This application claims the benefit of priority to JP 2017-089788 filed on Apr. 28, 2017, which is incorporated herein by reference in its entirety.

INDUSTRIAL APPLICABILITY

The embodiments of the present invention can be preferably applied to an image decoding device to decode coded data where image data is coded, and an image encoding device to generate coded data where image data is coded. The embodiments of the present invention can be preferably applied to a data structure of coded data generated by the image encoding device and referred to by the image decoding device.

REFERENCE SIGNS LIST

10 CT information decoding unit
11 Image encoding device
20 CU decoding unit
31 Image decoding device
41 Image display device

The invention claimed is:

1. A video decoding device for decoding a video, the video decoding device comprising:
   a memory; and
   a processor configured or programmed to execute instructions stored in the memory to:
   decode coded data and output quantization transform coefficients;
   perform an inverse quantization on the quantization transform coefficients and output secondary two-dimensional transform coefficients;
   arrange at least a portion of the secondary two-dimensional transform coefficients into secondary one-dimensional transform coefficients;
   perform an inverse secondary transform on the secondary one-dimensional transform coefficients and output primary one-dimensional inverse transform coefficients;
   arrange the primary one-dimensional inverse transform coefficients into primary two-dimensional inverse transform coefficients; and
   perform an inverse primary transform on the primary two-dimensional inverse transform coefficients,
   wherein,
   if a width of a secondary two-dimensional transform coefficients block is less than 8 or a height of the secondary two-dimensional transform coefficients block is less than 8, the primary one-dimensional inverse transform coefficients are stored in a squared region of 4*4,
   otherwise the primary one-dimensional inverse transform coefficients are stored in a non-squared region, and
   a shape of the non-squared region is formed by three 4*4 squared regions located at a top left, a top right and a bottom left without overlapping.

2. The video decoding device of claim 1, wherein the inverse secondary transform is a non-separable transform and the inverse primary transform is a two-dimensional separable transform.

* * * * *